US009656255B2

(12) United States Patent
Long et al.

(10) Patent No.: US 9,656,255 B2
(45) Date of Patent: *May 23, 2017

(54) CATALYTIC CRACKING CATALYST HAVING A RARE EARTH-CONTAINING Y ZEOLITE AND A PREPARATION PROCESS THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jun Long, Beijing (CN); Yuxia Zhu, Beijing (CN); Yibin Luo, Beijing (CN); Jinghui Deng, Beijing (CN); Jinyu Zheng, Beijing (CN); Fei Ren, Beijing (CN); Xue Yang, Beijing (CN); Ying Ouyang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 756 days.

This patent is subject to a terminal disclaimer.

(21) Appl. No.: 13/929,078

(22) Filed: Jun. 27, 2013

(65) Prior Publication Data

US 2014/0080697 A1    Mar. 20, 2014

(30) Foreign Application Priority Data

Sep. 14, 2012    (CN) .......................... 2012 1 0341383
Sep. 14, 2012    (CN) .......................... 2012 1 0341385
Sep. 14, 2012    (CN) .......................... 2012 1 0341407
Sep. 14, 2012    (CN) .......................... 2012 1 0341738
Sep. 14, 2012    (CN) .......................... 2012 1 0341750

(51) Int. Cl.

| | | |
|---|---|---|
| *B01J 29/06* | (2006.01) | |
| *B01J 29/80* | (2006.01) | |
| *B01J 29/03* | (2006.01) | |
| *B01J 29/00* | (2006.01) | |
| *B01J 35/00* | (2006.01) | |
| *B01J 29/08* | (2006.01) | |
| *B01J 37/00* | (2006.01) | |
| *C10G 11/05* | (2006.01) | |
| *C10G 11/18* | (2006.01) | |
| *B01J 37/10* | (2006.01) | |
| *B01J 29/40* | (2006.01) | |

(52) U.S. Cl.
CPC ............. *B01J 29/80* (2013.01); *B01J 29/005* (2013.01); *B01J 29/0308* (2013.01); *B01J 29/088* (2013.01); *B01J 35/002* (2013.01); *B01J 35/0006* (2013.01); *B01J 37/0045* (2013.01); *C10G 11/05* (2013.01); *C10G 11/18* (2013.01); *B01J 29/084* (2013.01); *B01J 29/40* (2013.01); *B01J 37/10* (2013.01); *B01J 2229/186* (2013.01); *B01J 2229/36* (2013.01); *B01J 2229/37* (2013.01); *B01J 2229/38* (2013.01); *B01J 2229/42* (2013.01)

(58) Field of Classification Search
USPC .................. 502/9, 65, 67, 68, 70, 71, 77, 79
See application file for complete search history.

(56) References Cited

U.S. PATENT DOCUMENTS

| | | |
|---|---|---|
| 3,442,795 A | 5/1969 | Kerr et al. |
| 3,714,072 A | 1/1973 | Maat et al. |
| 4,125,591 A | 11/1978 | Lindsley |
| 4,259,212 A | 3/1981 | Gladrow et al. |
| 4,503,023 A | 3/1985 | Breck et al. |

(Continued)

FOREIGN PATENT DOCUMENTS

| | | |
|---|---|---|
| CN | 1053808 A | 8/1991 |
| CN | 1026225 C | 10/1994 |

(Continued)

OTHER PUBLICATIONS

Machine translation of CN 1506161 A, Jun. 2004.*
Machine translation of CN 1362472 A, Aug. 2002.*
Tao, Liu, et.al., "Progress in Commercial Technologies for Domestic FCC Catalysts for High Efficiency Heavy Oil Conversion", Sino-Global Energy, 14(1), pp. 71-77 (2009).

(Continued)

*Primary Examiner* — Elizabeth Wood
(74) *Attorney, Agent, or Firm* — Novick, Kim & Lee, PLLC; Allen Xue

(57) ABSTRACT

The present invention relates to a catalytic cracking catalyst and a preparation process thereof, the catalytic cracking catalyst has a cracking active component, an optional mesoporous aluminosilicate material, a clay and a binder, wherein said cracking active component comprises, substantially consists of or consists of: a rare earth-containing Y zeolite, an optional other Y zeolite, and an optional MFI-structured zeolite, said rare earth-containing Y zeolite has a rare earth content as rare earth oxide of 10-25 wt %, e.g. 11-23 wt %; a unit cell size of 2.440-2.472 nm, e.g. 2.450-2.470 nm; a crystallinity of 35-65%, e.g. 40-60%; a Si/Al atom ratio in the skeleton of 2.5-5.0; and a product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 48, e.g. higher than 55.

25 Claims, 1 Drawing Sheet

(56) References Cited

U.S. PATENT DOCUMENTS

| | | |
|---|---|---|
| 4,556,478 A | 12/1985 | Shioiri et al. |
| 5,013,699 A | 5/1991 | Vassilakis et al. |
| 5,232,675 A | 8/1993 | Shu et al. |
| 5,286,370 A | 2/1994 | Chu et al. |
| 2009/0230023 A1 | 9/2009 | Iino et al. |
| 2014/0299511 A1 | 10/2014 | Luo et al. |

FOREIGN PATENT DOCUMENTS

| | | |
|---|---|---|
| CN | 1098130 A | 2/1995 |
| CN | 1288858 A | 3/2001 |
| CN | 1064929 C | 4/2001 |
| CN | 1297018 A | 5/2001 |
| CN | 1069553 C | 8/2001 |
| CN | 1317547 A | 10/2001 |
| CN | 1362472 A | 8/2002 |
| CN | 1382631 A | 12/2002 |
| CN | 1388064 A | 1/2003 |
| CN | 1436727 A | 8/2003 |
| CN | 1132898 C | 12/2003 |
| CN | 1506161 A | 6/2004 |
| CN | 1157465 C | 7/2004 |
| CN | 1624079 | 6/2005 |
| CN | 1676463 | 10/2005 |
| CN | 1727442 A | 2/2006 |
| CN | 1727445 A | 2/2006 |
| CN | 1733363 A | 2/2006 |
| CN | 1854258 A | 11/2006 |
| CN | 1951814 A | 4/2007 |
| CN | 100344374 C | 10/2007 |
| CN | 101081369 A | 12/2007 |
| CN | 101147875 A | 3/2008 |
| CN | 101250428 A | 8/2008 |
| CN | 101285001 A | 10/2008 |
| CN | 101385983 A | 3/2009 |
| CN | 101386788 A | 3/2009 |
| CN | 100497175 C | 6/2009 |
| CN | 101451074 A | 6/2009 |
| CN | 101537366 A | 9/2009 |
| CN | 101767028 A | 7/2010 |
| CN | 101823726 A | 9/2010 |
| CN | 101898144 A | 12/2010 |
| CN | 10209985 A | 4/2011 |
| CN | 101284243 B | 4/2011 |
| CN | 102125870 A | 7/2011 |
| CN | 103073024 A | 5/2013 |
| CN | 103130240 | 6/2013 |
| EP | 0421422 A2 | 4/1991 |
| EP | 2868629 A1 | 5/2015 |
| WO | WO 2011/115785 A1 | 9/2011 |

OTHER PUBLICATIONS

Extended European Search Report for European Patent Application No. 13837046.5, mailed Jun. 1, 2016 (10 pages).

Gao et al., "High silica REHY zeolite with low rare earth loading as high-performance catalyst for heavy oil conversion," *Applied Catalysis A: General*, 413-414: 254-260 (2012).

Shen et al., "The influence of calcining with steam on hydrothermal stability of zeolite REY molecular sieve," *Petrochemical Technology*, 25(5): 325-329 (1996).

Slade et al., "Conductivity variations in hydrated lanthanum-exchanged zeolites X, Y and A," *Solid State Ionics*, 57: 177-182 (1992).

Yu et al., "Mechanism of Rare Earth Cations on the Stability and Acidity of Y Zeolites," *Acta Physico-Chimica Sinica*, 27(11): 2528-2534 (2011).

International Search Report for International Application No. PCT/CN2013/000768 mailed Oct. 3, 2013 (2 pages).

International Preliminary Report on Patentability for International Application No. PCT/CN2013/000768, dated Jan. 8, 2015 (8 pages).

Extended European Search Report for European Patent Application No. 13810624.0, mailed Mar. 22, 2016 (10 pages).

Patent Examination Report No. 1 for Australian Patent No. 2013284233, mailed Jan. 18, 2016 (6 pages).

Japan Patent Office, Office Action for Japanese application No. 2015-531422 mailed on Mar. 14, 2017.

* cited by examiner

CATALYTIC CRACKING CATALYST HAVING A RARE EARTH-CONTAINING Y ZEOLITE AND A PREPARATION PROCESS THEREOF

The present application claims the priority of Chinese Patent Application Nos. 201210341407.1, 201210341750.6, 201210341383.X, 201210341738.5, and 201210341385.9 filed on Sep. 14, 2012, which is incorporated herein by reference in its entirety.

TECHNICAL FIELD

The present invention relates to a catalytic cracking catalyst having a rare earth-containing Y zeolite and a preparation process thereof.

BACKGROUND OF THE INVENTION

Fluid catalytic cracking (FCC) is an important process for the secondary processing of the crude oil, and plays a very important role in petroleum refineries. In the catalytic cracking process, heavy fractions such as vacuum distillate or heavier components such as residual oil are subjected to a reaction in the presence of catalyst to convert into high additional value products such as LPG, gasoline, and diesel oil. In this process, it is usually required to use a catalytic material with high cracking activity. Micro-porous zeolite catalytic material, due to the good shape-selective catalytic performance and the high cracking reaction activity, is widely used in the petroleum refining and processing industry. Since the Y zeolite was firstly used in 1960's, it has been the major active component in the catalytic cracking catalyst. Among others, the rare earth modified Y zeolite has a remarkable effect on improving the acidity and the structure stability of the zeolite.

In order to effectively utilize the rare earth resource and reduce the production cost for zeolites, especially for those having high rare earth content, it is requisite to increase the rare earth utilization in the modification and reduce the loss of rare earth, while the cracking performance of the zeolite should be maintained and the activity-stability of the zeolite should be increased as much as possible.

The currently used active component for reducing the olefin content in gasoline is mostly the rare earth-containing Y zeolite. References can be made to CN1317547A, CN1506161A, CN101537366A, CN1436727A, CN1382631A, CN101823726A, CN100344374C, CN1053808A, CN1069553C, CN1026225C, and CN101147875A.

For example, CN101147875A discloses a catalytic cracking catalyst, which contains a high rare earth ultra stable Y zeolite. Said high rare earth ultra stable Y zeolite is prepared as follows. An ultra stable Y zeolite used as starting material is mixed with an acid. The mixture is stirred, washed and filtered. To the mixture is added a solution of rare earth salt to conduct an exchange. Then the mixture is washed, filtered and dried. The product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of said high rare earth ultra stable Y zeolite and the rare earth content in the zeolite ($RE_2O_3\%$) is not higher than 40.

The rare earth-containing Y zeolite can be prepared through a one-exchange-and-one-calcination procedure (the ion exchange is conducted once and the high temperature calcination is conducted once, references can be made to, for example, CN1436727A, CN101823726A and CN100344374C), or a two-exchange-and-two-calcination procedure (the liquid-phase rare earth ion exchanges are conducted twice and the high temperature calcinations are conducted twice, references can be made to, for example, CN1506161A and CN101537366A).

For either the prior two-exchange-and-two-calcination procedure or the prior one-exchange-and-one-calcination procedure, in the preparation of the rare earth-containing Y zeolite, the amount of rare earth in the product is usually lower than the total fed amount of rare earth. Even if many rare earth ions are located in sodalite cages, it is inevitable that some rare earth ions are still present in super cages. The rare earth ions in super cages can be backwashed off in the subsequent washing procedures, resulting in the loss of rare earth and the decrease of the rare earth utilization.

In the current industry, for saving the production cost and increasing the product efficiencies, upon the preparation of the Y zeolite having high rare earth content, a two-exchange-and-one-calcination procedure is mostly used. That is to say, after the first calcination, the rare earth exchange is conducted once more, but the second calcination is not done. Due to the lack of the second calcination, the effective migration of rare earth ions cannot be achieved, and most of rare earth ions are still present in super cages. The rare earth ions in super cages can be backwashed off in the subsequent washing procedures, also resulting in the decrease of the rare earth utilization.

SUMMARY OF THE INVENTION

Therefore, an object of the present invention is to aim at the shortcomings in the prior art, and based on the prior art, provide a Y zeolite, which is different from those in the prior art and has good structure and activity stability, and high rare earth utilization. Another object of the present invention is to provide a process for preparing the rare earth-containing Y zeolite, which process has a short technological flow and a low production cost, and is able to produce the rare earth-containing Y zeolite having good structure and activity stability, and high rare earth utilization.

A further object of the present invention is to provide a catalyst having the rare earth-containing Y zeolite and a preparation process thereof.

Based on a large quantity of the experiments on the preparation of the rare earth-containing Y zeolite, the present inventors have found that the process combining the two-exchange-and-two-calcination of NaY zeolite with the deposition of rare earth results in a rare earth-containing Y zeolite that has a specific physichemical property. The new rare earth-containing Y zeolite is superior in the rare earth utilization and the zeolite structure stability. In particular, based on a large quantity of experiment data, it has been surprisingly found that there exists a unique relationship between the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the resulting rare earth-containing Y zeolite and the rare earth content in the zeolite ($RE_2O_3\%$). Based on this, the present invention is achieved.

In an aspect of the present invention, the present invention provides a rare earth-containing Y zeolite, which is characterized in that, the rare earth content as rare earth oxide is 10-25 wt %, e.g. 11-23 wt %, the unit cell size is 2.440-2.472 nm, e.g. 2.450-2.470 nm, the crystallinity is 35-65%, e.g. 40-60%, the Si/Al atom ratio in the skeleton is 2.5-5.0, the product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the zeolite and the weight percent of rare earth as rare earth oxide in the zeolite is higher than 48. The rare earth-containing Y zeolite of the present invention has a crystallinity retention after 17 hours of aging treatment at 800° C. in a condition of 100% steam of greater than 40%, e.g. greater than 45%.

In another aspect of the present invention, the present invention provides a process for preparing a rare earth-containing Y zeolite. The preparation process is a process combining the two-exchange-and-two-calcination procedure with the deposition of rare earth.

In another aspect of the present invention, the present invention provides a catalytic cracking catalyst, wherein said catalytic cracking catalyst has a cracking active component, an optional mesoporous aluminosilicate material, a clay and a binder, wherein said cracking active component has a rare earth-containing Y zeolite (hereinafter, also called as the first Y zeolite), an optional other Y zeolite, and an optional MFI-structured zeolite.

In another aspect of the present invention, the present invention provides a process for preparing a catalytic cracking catalyst, which process comprises mixing and pulping the cracking active component, the optional mesoporous aluminosilicate material, the clay and the binder, and then successively spray-drying, washing, filtering and drying.

Specifically, the present invention provides the following technical solutions:

1. A catalytic cracking catalyst, wherein said catalytic cracking catalyst has a cracking active component, an optional mesoporous aluminosilicate material, a clay and a binder, wherein said cracking active component comprises, substantially consists of or consists of: a rare earth-containing Y zeolite, an optional other Y zeolite, and an optional MFI-structured zeolite, said rare earth-containing Y zeolite has a rare earth content as rare earth oxide of 10-25 wt %, e.g. 11-23 wt %; a unit cell size of 2.440-2.472 nm, e.g. 2.450-2.470 nm; a crystallinity of 35-65%, e.g. 40-60%; a Si/Al atom ratio in the skeleton of 2.5-5.0; and a product of the ratio of the strength $I_1$ of the peak at 2θ=11.8±0.1° to the strength $I_2$ of the peak at 2θ=12.3±0.1° in the X-ray diffraction spectrogram of the zeolite and the weight percent of rare earth as rare earth oxide in the zeolite of higher than 48, e.g. higher than 55.

2. The catalytic cracking catalyst according to any one of the previous technical solutions, wherein said rare earth-containing Y zeolite has a crystallinity retention after 17 hours of aging treatment at 800° C. in a condition of 100% steam of greater than 40%, e.g. greater than 45%.

3 The catalytic cracking catalyst according to any one of the previous technical solutions, wherein said mesoporous aluminosilicate material has a pseudo-boehmite phase structure, an anhydrous chemical expression formula based on the oxide weight ratio of (0-0.3)$Na_2O$.(40-90)$Al_2O_3$.(10-60)$SiO_2$, an average pore diameter of 5-25 nm, a most probable pore diameter of 5-15 nm, a specific surface area of 200-400 m²/g, and a pore volume of 0.5-2.0 ml/g;

said clay is selected from the group consisting of kaolin, metahalloysite, montmorillonite, diatomite, halloysite, saponite, rectorite, sepiolite, attapulgite, hydrotalcite, bentonite and any mixture thereof; and said binder is selected from the group consisting of silica sol, alumina sol, pseudo-boehmite and any mixture thereof.

4. The catalytic cracking catalyst according to any one of the previous technical solutions, wherein per 100 weight parts of the catalytic cracking catalyst, said catalytic cracking catalyst contains 10-60 weight parts of the cracking active component, 10-70 weight parts of the clay, 10-60 weights parts of the binder, and 0-20 weight parts of the mesoporous aluminosilicate material.

5. The catalytic cracking catalyst according to any one of the previous technical solutions, wherein said other Y zeolite is selected from the group consisting of rare earth-containing DASY zeolite, rare earth-containing gas-phase ultra stable Y zeolite and Mg-containing ultra stable Y zeolite.

6. The catalytic cracking catalyst according to any one of the previous technical solutions, wherein said cracking active component comprises, substantially consists of or consists of:
the rare earth-containing Y zeolite,
optionally,
rare earth-containing DASY zeolite, and
optionally, only one of rare earth-containing gas-phase ultra stable Y zeolite, Mg-containing ultra stable Y zeolite and MFI-structured zeolite.

7. The catalytic cracking catalyst according to any one of the previous technical solutions, wherein per 100 weight parts of the catalytic cracking catalyst, said catalytic cracking catalyst contains 10-40 weight parts of the rare earth-containing Y zeolite, 0-15 weight parts of rare earth-containing DASY zeolite, and 0-25 weight parts of only one of rare earth-containing gas-phase ultra stable Y zeolite, Mg-containing ultra stable Y zeolite and MFI-structured zeolite.

8. The catalytic cracking catalyst according to any one of the previous technical solutions, wherein said rare earth-containing Y zeolite is prepared by a process comprising the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1) is subjected to a first calcination to obtain a rare earth- and sodium-containing Y zeolite;

(3) then either the rare earth- and sodium-containing Y zeolite obtained in step (2) is contacted with an ammonium salt solution or an acid solution, and then mixed with a rare earth solution, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite; (4) the rare earth- and sodium-containing Y zeolite obtained in step (3) is subjected to a second calcination to obtain the target rare earth-containing Y zeolite.

9. The catalytic cracking catalyst according to any one of the previous technical solutions, wherein said rare earth-containing Y zeolite is prepared by a process comprising the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1), after being filtered and washed with water, and dried, is subjected to a first calcination to obtain a rare earth- and sodium-containing Y zeolite;

(3) then either the rare earth- and sodium-containing Y zeolite obtained in step (2) is contacted with an ammonium salt solution, and then mixed with a rare earth solution without filtration, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;

(4) the rare earth- and sodium-containing Y zeolite obtained in step (3), after being filtered and washed with water, and dried, is subjected to a second calcination to obtain the target rare earth-containing Y zeolite.

10. The catalytic cracking catalyst according to any one of the previous technical solutions, wherein said rare earth-containing Y zeolite is prepared by a process comprising the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1), after being filtered and washed with water, and dried, is subjected to a first calcination to obtain a rare earth- and sodium-containing Y zeolite;

(3) the rare earth- and sodium-containing Y zeolite obtained in step (2) is contacted with an ammonium salt solution or an acid solution, filtered, and then mixed with a rare earth solution, and the mixture is adjusted to a pH of 6-10, to obtain a rare earth- and sodium-containing Y zeolite;

(4) the rare earth- and sodium-containing Y zeolite obtained in step (3), after being optionally filtered and washed with water, and dried, is subjected to a second calcination to obtain the target rare earth-containing Y zeolite.

11. The catalytic cracking catalyst according to any one of the technical solutions 8-10, wherein the ammonium salt is selected from the group consisting of ammonium chloride, ammonium nitrate, ammonium carbonate, ammonium hydrogen carbonate and any mixture thereof.

12. The catalytic cracking catalyst according to any one of the technical solutions 8-10, wherein in step (1), the weight ratio of the rare earth solution (as rare earth oxide) to the NaY zeolite (on the dry basis) is 0.06-0.14, e.g. 0.07-0.12, the weight ratio of the ammonium salt (as ammonium chloride) to the rare earth solution (as rare earth oxide) is 0-10, e.g. 0-5, such as 0.2-3, said ammonium salt is selected from the group consisting of ammonium chloride, ammonium nitrate, ammonium carbonate, ammonium hydrogen carbonate and any mixture thereof, the pH is adjusted to 3.0-5.0, the weight ratio of water:zeolite is controlled to 5-30, e.g. 7-15, said contact is conducted at room temperature (such as 18-26° C.) to 100° C., e.g. 70-95° C. for at least 0.3 hour, e.g. 0.5-3 hours, such as 0.5-1.5 hours.

13. The catalytic cracking catalyst according to any one of the technical solutions 8-10, wherein in step (2), said first calcination is conducted at 500-650° C., e.g. 530-630° C., such as 550-620° C., in a condition of 0-100% steam for at least 0.5 hour, e.g. 0.5-4.0 hours, 1.0-4.0 hours or 1.5-3.0 hours.

14. The catalytic cracking catalyst according to any one of the technical solutions 8-10, wherein in step (3), for the case of contacting the rare earth- and sodium-containing Y zeolite with the ammonium salt solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the ammonium salt solution, the weight ratio of the zeolite (dry basis):ammonium salt:water is 1:(0.05-0.5):(5-30), e.g. 1:(0.1-0.4):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said ammonium salt is selected from the group consisting of ammonium chloride, ammonium nitrate, ammonium carbonate, ammonium hydrogen carbonate and any mixture thereof;

for the case of contacting the rare earth- and sodium-containing Y zeolite with the acid solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the acid solution, the weight ratio of zeolite (dry basis):acid:water is 1:(0.03-0.2):(5-30), e.g. 1:(0.05-0.1):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said acid can be an inorganic acid or an organic acid, the inorganic acid can be selected from the group consisting of sulphuric acid, hydrochloric acid, nitric acid and any mixture thereof, the organic acid can be selected from the group consisting of oxalic acid, acetic acid, citric acid, tartaric acid, and any mixture thereof;

for the case of contacting the rare earth- and sodium-containing Y zeolite with the mixed solution of ammonium salt and rare earth solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite, the ammonium salt, and the rare earth solution, the weight ratio of zeolite (dry basis):ammonium salt:rare earth oxide ($RE_2O_3$):water is 1:(0.05-0.5):(0.01-0.2):(5-30), preferably 1:(0.1-0.4):(0.02-0.12):(8-15); said ammonium salt is selected from the group consisting of ammonium chloride, ammonium nitrate, ammonium carbonate, ammonium hydrogen carbonate and any mixture thereof.

15. The catalytic cracking catalyst according to the technical solution 14, wherein in step (3), after the contact, the mixture is adjusted with an alkaline liquid to a pH of 6-10, e.g. 7-9, such as 7.5-8.2.

16. The catalytic cracking catalyst according to the technical solution 15, wherein said alkaline liquid can be selected from the group consisting of aqueous ammonia, sodium silicate, sodium metaaluminate, sodium hydroxide and any mixture thereof.

17. The catalytic cracking catalyst according to any one of the technical solutions 8-10, wherein in step (4), said second calcination is conducted at 500-650° C., in a condition of 0-100% steam for 0.5-4 hours, e.g. 1-3 hours.

18. A process for preparing a catalytic cracking catalyst, which process comprises: preparing a slurry containing an cracking active component, an optional mesoporous aluminosilicate material, a clay and a binder; and spray-drying the prepared slurry, wherein said cracking active component comprises, substantially consists of or consists of: a rare earth-containing Y zeolite, an optional other Y zeolite, and an optional MFI-structured zeolite, said rare earth-containing Y zeolite has a rare earth content as rare earth oxide of 10-25 wt %, e.g. 11-23 wt %, a unit cell size of 2.440-2.472 nm, e.g. 2.450-2.470 nm, a crystallinity of 35-65%, e.g. 40-60%, a Si/Al atom ratio in the skeleton of 2.5-5.0, and a product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 48, e.g. higher than 55.

19. The process for preparing the catalytic cracking catalyst according to the technical solution 18, wherein said mesoporous aluminosilicate material has a pseudo-boehmite phase structure, an anhydrous chemical expression formula based on the oxide weight ratio of $(0-0.3)Na_2O \cdot (40-90)Al_2O_3 \cdot (10-60)SiO_2$, an average pore diameter of 5-25 nm, a most probable pore diameter of 5-15 nm, a specific surface area of 200-400 m$^2$/g, and a pore volume of 0.5-2.0 ml/g;

said clay is selected from the group consisting of kaolin, metahalloysite, montmorillonite, diatomite, halloysite, saponite, rectorite, sepiolite, attapulgite, hydrotalcite, bentonite and any mixture thereof; and said binder is selected from the group consisting of silica sol, alumina sol, pseudoboehmite and any mixture thereof.

20. The process for preparing the catalytic cracking catalyst according to any one of the technical solutions 18-19, wherein per 100 weight parts of the catalytic cracking catalyst, 10-60 weight parts of the cracking active component, 10-70 weight parts of the clay, 10-60 weights parts of the binder, and 0-20 weight parts of the mesoporous aluminosilicate material are used on the dry basis to prepare the slurry.

21. The process for preparing the catalytic cracking catalyst according to any one of the technical solutions 18-20, wherein said other Y zeolite is selected from the group consisting of rare earth-containing DASY zeolite, rare earth-containing gas-phase ultra stable Y zeolite and Mg-containing ultra stable Y zeolite.

22. The process for preparing the catalytic cracking catalyst according to any one of the technical solutions 18-21, wherein said cracking active component comprises, substantially consists of or consists of:

said rare earth-containing Y zeolite,
optionally,
rare earth-containing DASY zeolite, and
optionally, only one of rare earth-containing gas-phase ultra stable Y zeolite, Mg-containing ultra stable Y zeolite and MFI-structured zeolite.

23. The process for preparing the catalytic cracking catalyst according to any one of the technical solutions 18-22, wherein per 100 weight parts of the catalytic cracking catalyst, 10-40 weight parts of the rare earth-containing Y zeolite, 0-15 weight parts of rare earth-containing DASY zeolite, and 0-25 weight parts of only one of rare earth-containing gas-phase ultra stable Y zeolite, Mg-containing ultra stable Y zeolite and MFI-structured zeolite are used on the dry basis to prepare the slurry.

24. The process for preparing the catalytic cracking catalyst according to any one of the technical solutions 18-23, wherein said rare earth-containing Y zeolite is prepared according to the process as defined in any one of the technical solutions 8-17.

When the rare earth-containing Y zeolite contained in the catalytic cracking catalyst of the present invention is used alone or in combination with other zeolite(s), the catalytic cracking catalyst shows a high activity and a high conversion. Furthermore, said rare earth-containing Y zeolite can be used in combination with different zeolites for the increased production of gasoline, diesel oil and/or LPG. Therefore, the catalytic cracking catalyst can have a wide adaptability. In addition, whether used alone or in combination with others, the catalytic cracking catalyst having said rare earth-containing Y zeolite has good structure stability.

DESCRIPTION OF PREFERRED EMBODIMENTS

Figure 1:
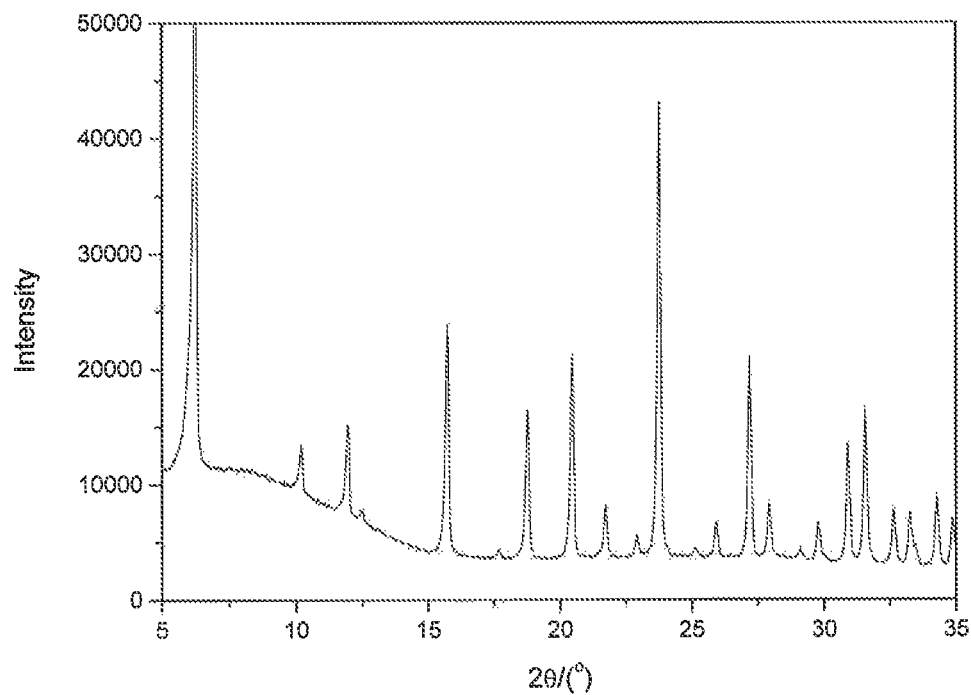
FIG. 1 is an X-ray diffraction spectrogram of the rare earth-containing Y zeolite prepared according to Example 1.

The first Y zeolite and a preparation process thereof

According to the present invention, the utilization efficiency of the rare earth starting material can be shown by rare earth utilization. The rare earth utilization refers to a ratio of the rare earth amount as rare earth oxide ($RE_2O_3$) in the product to the theoretical rare earth feeding amount as rare earth oxide ($RE_2O_3$), as a weight percent. The rare earth-containing Y zeolite of the present invention has a rare earth utilization of higher than 98%.

The Si/Al atom ratio in the skeleton according to the present invention refers to the atomic molar ratio of Si and Al in the rare earth-containing Y zeolite of the present invention. There also several measurements for the Si/Al ratio. For example, the Si/Al ratio can be obtained by the measurement for crystal cell parameter s with X-ray diffraction and calculation, or by the infrared spectroscopy, or by the nuclear magnetic resonance (NMR) measurement and calculation. In the present invention, the Si/Al atom ratio in the skeleton is obtained by the nuclear magnetic resonance (NMR) measurement and calculation. The Si/Al ratio of the zeolite mentioned in the present invention refers to the Si/Al atom ratio in the skeleton of the zeolite.

For the rare earth-containing Y zeolite, in its X-ray diffraction spectrogram, the peak at $2\theta=11.8\pm0.1°$ can be used to characterize the rare earth distribution in the sodalite cage, and $I_1$ is used to represent its peak strength; the peak at $2\theta=12.3\pm0.1°$ can be used to characterize the rare earth distribution in the super cage, and $I_2$ is used to represent its peak strength; the ratio of $I_1$ to $I_2$ can be used to characterize the migration degree of rare earth ions from the super cages to the sodalite cages. According to the present invention, the peak strength is a relative strength relative to a peak-forming plane (in other words, the peak strength is a peak strength subtracting the base line strength). For example, if the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of a rare earth-containing zeolite is 5, and the weight percent of rare earth as rare earth oxide in the zeolite is 10%, then the product is 5×10=50. The product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the rare earth-containing Y zeolite of the present invention and the weight percent of rare earth as rare earth oxide in the zeolite is higher than 48. According to the present invention, the upper limit of that product is not limited, for example, the upper limit can be 200, e.g. 100. In a preferable embodiment of the present invention, the range of that product is 48-200, e.g. 48-100. More preferably, that product is higher than 55, higher than 60, higher than 70, e.g. 55-200, such as 55-90.

According to the present invention, said crystallinity retention is the ratio of the crystallinity of the sample after the aging treatment to that before the aging treatment, wherein the aging treatment comprises: mixing the zeolite and an ammonium chloride solution to exchange until the content of Na$_2$O is below 0.3 wt %, then filtering, drying, and aging at 800° C. in a condition of 100% steam for 17 hours; if the zeolite has a Na$_2$O content of below 0.3 wt %, then directly aging at 800° C. in a condition of 100% steam for 17 hours without the exchange, filtering and drying.

In an aspect of the present invention, the rare earth-containing Y zeolite of the present invention is characterized in that, the rare earth content as rare earth oxide is 10-25 wt %, e.g. 11-23 wt %, the unit cell size is 2.440-2.472 nm, e.g. 2.450-2.470 nm, the crystallinity is 35-65%, e.g. 40-60%, the Si/Al atom ratio in the skeleton is 2.5-5.0, the product of the ratio of the strength I$_1$ of the peak at 2θ=11.8±0.1° to the strength I$_2$ of the peak at 2θ=12.3±0.1° (I$_1$/I$_2$) in the X-ray diffraction spectrogram of the zeolite and the weight percent of rare earth as rare earth oxide in the zeolite is higher than 48. The rare earth-containing Y zeolite of the present invention has a crystallinity retention after 17 hours of aging treatment at 800° C. in a condition of 100% steam of greater than 40%, e.g. greater than 45%.

In another aspect of the present invention, the present invention provides a process for preparing a rare earth-containing Y zeolite. The preparation process is a process combining the two-exchange-and-two-calcination with the deposition of rare earth.

In an embodiment of the present invention, the process for preparing the rare earth-containing Y zeolite of the present invention comprises the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1) is subjected to a first calcination to obtain a rare earth- and sodium-containing Y zeolite;

(3) then either the rare earth- and sodium-containing Y zeolite obtained in step (2) is contacted with an ammonium salt solution or an acid solution, and then mixed with a rare earth solution, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;

(4) the rare earth- and sodium-containing Y zeolite obtained in step (3) is subjected to a second calcination to obtain the target rare earth-containing Y zeolite.

In another embodiment of the present invention, the process for preparing the rare earth-containing Y zeolite of the present invention comprises the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1), after being filtered and washed with water, and dried, is subjected to a first calcination to obtain a rare earth- and sodium-containing Y zeolite;

(3) then either the rare earth- and sodium-containing Y zeolite obtained in step (2) is contacted with an ammonium salt solution, and then mixed with a rare earth solution without filtration, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;

(4) the rare earth- and sodium-containing Y zeolite obtained in step (3), after being filtered and washed with water, and dried, is subjected to a second calcination to obtain the target rare earth-containing Y zeolite.

In another embodiment of the present invention, the process for preparing the rare earth-containing Y zeolite of the present invention comprises the following steps:

(1) a NaY zeolite and a rare earth solution or a mixed solution of ammonium salt and rare earth solution are contacted to obtain a rare earth- and sodium-containing Y zeolite;

(2) the rare earth- and sodium-containing Y zeolite obtained in step (1), after being filtered and washed with water, and dried, is subjected to a first calcination to obtain a rare earth- and sodium-containing Y zeolite;

(3) the rare earth- and sodium-containing Y zeolite obtained in step (2) is contacted with an ammonium salt solution or an acid solution, filtered, and then mixed with a rare earth solution, and the mixture is adjusted to a pH of 6-10, to obtain a rare earth- and sodium-containing Y zeolite;

(4) the rare earth- and sodium-containing Y zeolite obtained in step (3), after being optionally filtered and washed with water, and dried, is subjected to a second calcination to obtain the target rare earth-containing Y zeolite.

According to the preparation process of the present invention, the NaY zeolite as starting material has a Si/Al atom ratio in the skeleton of preferably >2.5 and a crystallinity of >80%.

According to the preparation process of the present invention, the ammonium salt is selected from the group consisting of ammonium chloride, ammonium nitrate, ammonium carbonate, ammonium hydrogen carbonate and any mixture thereof.

In step (1) of the process for preparing the rare earth-containing Y zeolite, the weight ratio of the rare earth solution (as rare earth oxide) to the NaY zeolite (on the dry basis) is 0.06-0.14, e.g. 0.07-0.12, the weight ratio of the ammonium salt (as ammonium chloride) to the rare earth solution (as rare earth oxide) is 0-10, e.g. 0-5, such as 0.2-3, said ammonium salt is selected from the group consisting of ammonium chloride, ammonium nitrate, ammonium carbonate, ammonium hydrogen carbonate and any mixture thereof, the pH is adjusted to 3.0-5.0, the weight ratio of water:zeolite is controlled to 5-30, e.g. 7-15, said contact is conducted at room temperature (such as 18-26° C.) to 100° C., e.g. 70-95° C. for at least 0.3 hour, e.g. 0.5-3 hours, such as 0.5-1.5 hours.

In step (2) of the process for preparing the rare earth-containing Y zeolite, said first calcination is conducted at 500-650° C., e.g. 530-630° C., such as 550-620° C., in a condition of 0-100% steam for at least 0.5 hour, e.g. 0.5-4.0 hours, 1.0-4.0 hours or 1.5-3.0 hours. The calcination can promote the migration of rare earth ions from the super cages of the zeolite to the sodalite cages. The first calcination is preferably conducted in a condition of 1-100%, preferably 20-100%, more preferably 100% steam.

In step (3) of the process for preparing the rare earth-containing Y zeolite, for the case of contacting the rare earth- and sodium-containing Y zeolite with the ammonium salt solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the ammonium salt solution, the weight ratio of the zeolite (dry basis):ammonium saltwater is 1:(0.05-0.5):(5-30), e.g. 1:(0.1-0.4):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said ammonium salt is selected from the group consisting of ammonium chloride, ammonium nitrate, ammonium carbonate, ammonium hydrogen carbonate and any mixture thereof;

for the case of contacting the rare earth- and sodium-containing Y zeolite with the acid solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the acid solution, the weight ratio of zeolite (dry basis):acid:water is 1:(0.03-0.2): (5-30), e.g. 1:(0.05-0.1):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said acid can be an inorganic acid or an organic acid, the inorganic acid can be selected from the group consisting of sulphuric acid, hydrochloric acid, nitric acid and any mixture thereof, the organic acid can be selected from the group consisting of oxalic acid, acetic acid, citric acid, tartaric acid, and any mixture thereof;

for the case of contacting the rare earth- and sodium-containing Y zeolite with the mixed solution of ammonium salt and rare earth solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite, the ammonium salt, and the rare earth solution, the weight ratio of zeolite (dry basis):ammonium salt: rare earth oxide ($RE_2O_3$):water is 1:(0.05-0.5):(0.01-0.2):(5-30), e.g. 1:(0.1-0.4):(0.02-0.12):(8-15); said ammonium salt is selected from the group consisting of ammonium chloride, ammonium nitrate, ammonium carbonate, ammonium hydrogen carbonate and any mixture thereof;

After the above contact, the mixture is adjusted with an alkaline liquid to a pH of 6-10, preferably 7-9, and more preferably 7.5-8.2, so that all of rare earth ions deposit to form are earth hydroxide, i.e., the deposition of rare earth. The time is not particularly limited, for example, 5 minutes to 2 hours, e.g. 10 minutes to 60 minutes, 10 minutes to 30 minutes. Said alkaline liquid can be selected from the group consisting of aqueous ammonia, sodium silicate, sodium metaaluminate, sodium hydroxide and any mixture thereof.

In step (4) of the process for preparing the rare earth-containing Y zeolite, said second calcination is conducted at 500-650° C., in a condition of 0-100% steam for 0.5-4 hours, e.g. 1-3 hours. The second calcination is preferably conducted in a condition of 1-100%, preferably 20-100%, more preferably 100% steam.

The various conditions listed in the above steps (1) to (4) (including the preferable conditions and exemplified conditions) can be combined to obtain a technical solution, which is also in the scope of the present invention.

According to the preparation process of the present invention, rare earth is selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). Preferably, rare earth is selected from the group consisting of lanthanum (La) and cerium (Ce). The rare earth starting material can be provided in a form of soluble salt such as nitrate and hydrochloride. The rare earth starting material can be a rare earth chloride or a rare earth nitrate containing a single rare earth element, such as lanthanum chloride, lanthanum nitrate, cerium chloride, and cerium nitrate, and also can be a mixed rare earth material having a various rare earth element ratio, such as a cerium-rich or lanthanum-rich mixed rare earth material. For example, said rare earth solution can be a solution containing one or more of lanthanum nitrate, cerium nitrate, lanthanum chloride, cerium chloride, a mixed rare earth nitrate, and a mixed rare earth chloride, wherein the mixed rare earth nitrate refers to (REx1 REx2 . . . RExn)(NO3)3, wherein REx1, REx2, RExn refer to rare earth elements, wherein n is an integer of 2 or more, the sum of x1+x2+ . . . +xn equals to 1; a mixed rare earth chloride (also named rare earth chloride) refers to (REy1 REy2 . . . REyn)Cl3, wherein REy1, REy2, . . . , REyn refer to rare earth elements, wherein n is an integer of 2 or more, the sum of y1+y2+ . . . +yn equals to 1.

According to the preparation process of the present invention, the rare earth-containing Y zeolite is prepared through one liquid phase exchange of rare earth ions and one solid-phase migration of rare earth ions. The process having the rare earth exchange and the rare earth deposition in combination with two calcinations ensure few or no loss of rare earth and the migration of rare earth ions from the super cages to the sodalite cages. The rare earth content can be flexibly adjusted and accurately controlled, and the operation is simple. Furthermore, in the second exchange using an ammonium salt, after contacting with the ammonium salt and before the deposition of rare earth, the filtering step can be omitted. Therefore, the preparation process is shortened and the loss of rare earth can be further reduced. According to the present invention, the earth utilization can be up to 98% or more. The rare earth resource is effectively saved and the production cost is further decreased.

The rare earth-containing Y zeolites obtained according to the prior method (such as those in CN1053808A and CN100344374C, or the conventional industrial two-exchange-and-two-calcination procedure) have a crystallinity retention after 17 hours of aging treatment at 800° C. in a condition of 100% steam of less than 40%. On the contrary, the rare earth-containing Y zeolite of the present invention has a higher crystallinity retention after 17 hours of aging treatment at 800° C. in a condition of 100% steam, e.g. greater than 40%, e.g. greater than 45%, which shows good structure stability. Therefore, in comparison with the prior art, the rare earth-containing Y zeolite of the present invention has good structure stability. The rare earth-containing Y zeolite of the present invention has good activity stability (high light oil micro-activity (MA) value). When the rare earth-containing Y zeolite of the present invention is used as the active component of the catalyst, the used amount in the catalyst can be reduced and the catalyst production cost can be decreased.

The Cracking Active Component

In the catalytic cracking catalyst of the present invention, besides the above mentioned first Y zeolite, said cracking active component can optionally comprise other Y zeolite (the second Y zeolite, the third Y zeolite and the like) and/or MFI-structured zeolite.

According to the present invention, the weight ratio of each component in said cracking active component is on the dry basis, and the dry basis weight of a sample is measured after calcining the sample at 800° C. for 1 hour.

Other Y Zeolite

Herein, the other Y zeolite refers to a Y zeolite having not the features of the above first Y zeolite (including the feature of the product of the above $I_1/I_2$ and the rare earth content being higher than 48, e.g. higher than 55, higher than 60, higher than 70).

In an embodiment, based on the dry basis weight of said active component, on the dry basis, the content of said other Y zeolite is 0-50 wt %, e.g. 0-40 wt %, 0-30 wt %, 0-20 wt %, the content of the first Y zeolite is 50-100 wt %, e.g. 60-100 wt %, 70-100 wt % or 80-100 wt %. Preferably, if the other Y zeolite is contained, based on the dry basis weight of the catalyst, in said catalytic cracking catalyst, the content of said rare earth-containing Y zeolite (the first Y zeolite) is 10-60%, e.g. 20-40 wt %; the content of the other Y zeolite is not more than 35 wt %, e.g. the content of the other Y zeolite can be 0.5-30 wt %, 0-10 wt % or 0-5 wt %.

In an embodiment, said other Y zeolite is a rare earth-containing DASY zeolite (a rare earth-containing hydrothermally ultra stable Y zeolite), as $RE_2O_3$ (rare earth oxide), said rare earth-containing DASY zeolite has a rare earth content of 1.5-3.0 wt %. Said rare earth-containing DASY zeolite can be various commercial products, e.g. DASY2.0 zeolite available from Sinopec Catalyst Company Qilu Division.

In an embodiment, said other Y zeolite is a rare earth-containing gas-phase ultra stable Y zeolite, which can be prepared as follows. Under stirring, a rare earth-containing Y zeolite is contacted with tetrachlorosilane at 100-500° C. for 0.1-10 hours, wherein the weight ratio of said rare earth-containing Y zeolite to tetrachlorosilane is 1:0.05-0.5. For the specific preparation method, a reference can be made to CN1683244A or CN1286721C, in particular, Examples 5, 6 and 8.

In an embodiment, said other Y zeolite is a Mg-containing ultra stable Y zeolite, said Mg-containing ultra stable Y zeolite has a Mg content as MgO of 0.1-25 wt %, preferably 0.5-25 wt %. This zeolite can be prepared according to the conventional methods. One method comprises dispersing a magnesium compound (e.g. at least one of magnesium oxide, magnesium chloride, magnesium sulfate and magnesium nitrate), which is dissolved or sufficiently wet-grounded, evenly into a slurry of an ultra stable Y zeolite (USY zeolite), optionally adding aqueous ammonia thereto, mixing homogenously, drying and calcining. The other method can for example comprise dispersing an ultra stable Y zeolite (USY zeolite), which is sufficiently wet-grounded, evenly into a solution containing a magnesium compound (e.g. at least one of magnesium chloride, magnesium sulfate and magnesium nitrate), adding aqueous ammonia thereto, mixing homogenously, filtering, washing, drying and calcining. For the specific examples of the above preparation methods for Mg-containing ultra stable Y zeolite, for example, a reference can be made to CN1297018A or CN1157465C, in particular, Examples 1-5.

MFI-Structured Zeolite

MFI-structured zeolite can be commercially available or prepared according to the known method. The example of MR-structured zeolite comprises ZSM-5, ZRP, ZSP and any mixture thereof.

In an embodiment, said MFI-structured zeolite has an anhydrous chemical composition expression formula based on the weight ratio as oxide: $(0-0.3)Na_2O.(0.5-5.5)Al_2O_3.(1.3-10)P_2O_5.(0.7-15)$ $M1xOy.(0.01-5)M2mOn.(70-97)SiO_2$, wherein, M1 is Fe, Co or Ni, x represents the atom number for M1, y represents the oxygen number required for satisfying the oxidation state of M1, M2 is selected from the group consisting of Zn, Mn, Ga or Sn, m represents the atom number of M2, n represents the oxygen number required for satisfying the oxidation state of M2.

In a preferable embodiment, said MFI-structured zeolite has a formula based on the oxide weight ratio of $(0-0.2)Na_2O.(0.9-5.0)Al_2O_3.(1.5-7)P_2O_5.(0.9-10)M1xOy.(0.5-2)M2mOn.(82-92)SiO_2$. In a preferable embodiment, M1 is Fe, and M2 is Zn.

According to the present invention, for the specific preparation method for said MFI-structured zeolite, a reference can be made to CN1611299A, in particular, Examples 1-11.

Mesoporous Aluminosilicate Material

Said mesoporous aluminosilicate material has a pseudo-boehmite phase structure. It has an anhydrous chemical expression formula based on the oxide weight ratio of $(0-0.3)Na_2O.(40-90)Al_2O_3.(10-60)SiO_2$. It has an average pore diameter of 5-25 nm, a most probable pore diameter of 5-15 nm, a specific surface area of 200-400 $m^2/g$, and a pore volume of 0.5-2.0 ml/g.

For the details about said mesoporous aluminosilicate material and a preparation process thereof, a reference can be made to CN1565733A or CN 1854258A, for example, Examples 1-9 of CN 1854258A.

Clay

According to the present invention, said clay can be a clay conventionally used in the catalytic cracking catalyst, for example, can be one or more of kaolin, metahalloysite, montmorillonite, diatomite, halloysite, saponite, rectorite, sepiolite, attapulgite, hydrotalcite and bentonite.

Binder

According to the present invention, said binder can be a binder conventionally used in the catalytic cracking catalyst, for example, can be one or more of silica sol, alumina sol and pseudoboehmite, preferably a dual-aluminum binder of pseudoboehmite and alumina sol.

Catalytic Cracking Catalyst

In an embodiment, based on the dry basis weight of said catalytic cracking catalyst, said catalytic cracking catalyst contains 10-60 wt % of the cracking active component, 20-70 wt % of the clay and 10-50 wt % of the binder. In a further embodiment, based on the dry basis weight of said catalytic cracking catalyst, the content on the dry basis of said cracking active component is 10-50 wt %, the content on the dry basis of said clay is 20-60 wt %, and the content on the dry basis of said binder is 10-40 wt %. More preferably, based on the dry basis weight of said catalytic cracking catalyst, the content on the dry basis of said cracking active component is 20-40 wt %, the content on the dry basis of said clay is 20-45 wt %, and the content on the dry basis of said binder is 20-40 wt %, e.g. 25-35 wt %.

In an embodiment, based on the dry basis weight of said catalytic cracking catalyst, said catalytic cracking catalyst contains 10-60 wt % of the cracking active component, 1-20 wt % of the mesoporous aluminosilicate material, 10-60 wt % of the clay and 10-50 wt % of the binder. In a further embodiment, based on the dry basis weight of said catalytic cracking catalyst, the content on the dry basis of said cracking active component is 20-50 wt %, the content on the dry basis o said mesoporous aluminosilicate material is 1-18 wt %, e.g. 2-15 wt %, the content on the dry basis of said clay is 10-50 wt %, the content on the dry basis of said binder is 10-40 wt %. More preferably, based on the dry basis weight of said catalytic cracking catalyst, the content on the dry basis of said cracking active component is 20-40 wt %, the content on the dry basis of said mesoporous aluminosilicate material is 1-15 wt %, the content on the dry basis of said clay is 15-45 wt %, the content on the dry basis of said binder is 20-35 wt %.

In an embodiment, based on the dry basis weight of said catalytic cracking catalyst, said catalytic cracking catalyst contains 10-60 wt % of the cracking active component, 10-60 wt % of the clay and 10-60 wt % of the binder, wherein said cracking active component comprises 25-70 wt % of the first Y zeolite, 10-70 wt % of the second Y zeolite and 5-30 wt % of the third Y zeolite, wherein the second Y zeolite is a rare earth-containing gas-phase ultra stable Y zeolite; the third Y zeolite is a rare earth-containing DASY zeolite, having a rare earth content of preferably 1.5-3 wt %. In a further embodiment, based on the dry basis weight of said catalytic cracking catalyst, the content on the dry basis of said cracking active component is 20-50 wt %, the content on the dry basis of said clay is 20-50 wt %, and the content on the dry basis of said binder is 10-50 wt %. More preferably, based on the dry basis weight of said catalytic cracking catalyst, the content on the dry basis of said cracking active component is 20-45 wt %, e.g. 30-42 wt %, the content on the dry basis of said clay is 30-45 wt %, e.g. 35-45 wt %, the content on the dry basis of said binder is 15-40 wt %, e.g. 20-35 wt % or 25-32 wt %. Said cracking active component comprises 25-70 wt % of the first Y zeolite, 10-70 wt % of the second Y zeolite and 5-25 wt % of the third Y zeolite, for example, said cracking active component can comprise 30-65 wt %, of the first Y zeolite, 15-65 wt % of the second Y zeolite and 5-20 wt % of the third Y zeolite, wherein the second Y zeolite is a rare earth-containing gas-phase ultra stable Y zeolite; the third Y zeolite is a rare earth-containing DASY zeolite, having a rare earth content of preferably 1.5-3 wt %.

In an embodiment, based on the dry basis weight of said catalytic cracking catalyst, said catalytic cracking catalyst contains 10-60 wt % of the cracking active component, 10-70 wt % of the clay and 10-60 wt % of the binder, wherein said cracking active component comprises 35-70 wt % of the first Y zeolite, 20-60 wt % of the second Y zeolite and 2-20 wt % of the third Y zeolite; wherein the second Y zeolite is a Mg-containing ultra stable Y zeolite, the third Y zeolite is a rare earth-containing DASY zeolite, Preferably, the dry basis weight ratio of said first zeolite to said second zeolite is 0.5-4:1, the dry basis weight ratio of the third Y zeolite to the first Y zeolite is 0.05:0.5-1, such as 0.1-0.3:1. Alternatively, in said cracking active component, the first Y zeolite can comprise 39-70 wt %, the second Y zeolite can comprise 22-55 wt %, the third Y zeolite can comprise 5-20 wt %, wherein the second Y zeolite is a Mg-containing ultra stable Y zeolite, the third Y zeolite is a rare earth-containing DASY zeolite. Preferably, for the catalytic cracking catalyst of the present invention, based on the dry basis weight of said catalytic cracking catalyst, the content on the dry basis of said cracking active component is 20-50 wt %, the content on the dry basis of said clay is 20-50 wt %, and the content on the dry basis of said binder is 10-50 wt %. More preferably, based on the dry basis weight of said catalytic cracking catalyst, the content on the dry basis of said cracking active component is 30-45 wt %, the content on the dry basis of said clay is 25-45 wt %, and the content on the dry basis of said binder is 20-40 wt %.

In an embodiment, based on the dry basis weight of said catalytic cracking catalyst, said catalytic cracking catalyst contains 20-60 wt % of the cracking active component, 1-20 wt % of the mesoporous aluminosilicate material, 10-70 wt % of the clay and 10-60 wt % of the binder, said cracking active component contains 70-90 wt % of Y zeolite and 10-30 wt % of MFI-structured zeolite, wherein said Y zeolite comprises the first Y zeolite and other Y zeolite, on the dry basis. In a further embodiment, based on the total weight of said Y zeolite, said Y zeolite comprises 70-99 wt % of the first Y zeolite and 1-30 wt % of the second Y zeolite, wherein the second Y zeolite is preferably rare earth-containing DASY zeolite, having a rare earth content of preferably 1.5-3 wt %. In a further embodiment, based on the dry basis weight of said catalytic cracking catalyst, the content on the dry basis of said cracking active component is 20-45 wt %, the content on the dry basis o said mesoporous aluminosilicate material is 2-10 wt %, the content on the dry basis of said clay is 20-40 wt %, and the content on the dry basis of said binder is 20-35 wt %.

In an embodiment, per 100 weight parts of catalytic cracking catalyst, said catalytic cracking catalyst contains 10-60 weight parts of the cracking active component, 10-70 weight parts of the clay, 10-60 weights parts of the binder, and 0-20 weight parts of the mesoporous aluminosilicate material. In a further embodiment, per 100 weight parts of catalytic cracking catalyst, said catalytic cracking catalyst contains 28-38 weight parts of the cracking active component, 20-44 weight parts of the clay, 21-34 weight parts of the binder, and 0-12 weight parts of the mesoporous aluminosilicate material.

In an embodiment, said catalytic cracking catalyst substantially consists of 10-60 weight parts of the cracking active component, 10-70 weight parts of the clay, 10-60 weights parts of the binder, and 0-20 weight parts of the mesoporous aluminosilicate material. In a further embodiment, said catalytic cracking catalyst substantially consists of 28-38 weight parts of the cracking active component, 20-44 weight parts of the clay, 21-34 weight parts of the binder, and 0-12 weight parts of the mesoporous aluminosilicate material.

In an embodiment, per 100 weight parts of catalytic cracking catalyst, said catalytic cracking catalyst contains 10-60 weight parts of the cracking active component, 10-70 weight parts of the clay, 10-60 weights parts of the binder, and 0-20 weight parts of the mesoporous aluminosilicate material, wherein said cracking active component comprises, substantially consists of or consists of: 10-40 weight parts of the rare earth-containing Y zeolite, 0-25 weight parts of the optional other Y zeolite, and 0-12 weight parts of the optional MFI-structured zeolite. In a further embodiment, said other Y zeolite is selected from one or two of rare earth-containing DASY zeolite, rare earth-containing gas-phase ultra stable Y zeolite and Mg-containing ultra stable Y zeolite.

In an embodiment, per 100 weight parts of catalytic cracking catalyst, said catalytic cracking catalyst contains 28-38 weight parts of the cracking active component, 20-44 weight parts of the clay, 21-34 weight parts of the binder, and 0-12 weight parts of the mesoporous aluminosilicate material, wherein said cracking active component comprises, substantially consists of or consists of: 10-34 weight parts of the rare earth-containing Y zeolite, 0-23 weight parts of the optional other Y zeolite, and 0-10 weight parts of the optional MFI-structured zeolite. In a further embodiment, said other Y zeolite is selected from one or two of rare earth-containing DASY zeolite, rare earth-containing gas-phase ultra stable Y zeolite and Mg-containing ultra stable Y zeolite.

In an embodiment, in the catalytic cracking catalyst, said cracking active component comprises, substantially consists of or consists of:

the rare earth-containing Y zeolite,
optionally,
rare earth-containing DASY zeolite, and
optionally, only one of the rare earth-containing gas-phase ultra stable Y zeolite, the Mg-containing ultra stable Y zeolite and the MFI-structured zeolite.

In an embodiment, per 100 weight parts of catalytic cracking catalyst, said catalytic cracking catalyst comprises, substantially consists of or consists of:
15-50 weight parts of the clay,
15-50 weights parts of the binder,
0-15 weight parts of the mesoporous aluminosilicate material,
10-40 weight parts of the rare earth-containing Y zeolite,
0-15 weight parts of the rare earth-containing DASY zeolite, and
0-25 weight parts of only one of the rare earth-containing gas-phase ultra stable Y zeolite, the Mg-containing ultra stable Y zeolite and the MFI-structured zeolite.

In a further embodiment, per 100 weight parts of catalytic cracking catalyst, said catalytic cracking catalyst comprises, substantially consists of or consists of:
20-44 weight parts of the clay,
21-34 weight parts of the binder,
0-12 weight parts of the mesoporous aluminosilicate material,
10-34 weight parts of the rare earth-containing Y zeolite,
0-10 weight parts of the rare earth-containing DASY zeolite, and
only one of 5-20 weight parts of rare earth-containing gas-phase ultra stable Y zeolite, or 8-21 weight parts of Mg-containing ultra stable Y zeolite, or 5-10 weight parts of MFI-structured zeolite.

In an embodiment, in the catalytic cracking catalyst, said cracking active component comprises, substantially consists of or consists of:
the present rare earth-containing Y zeolite,
the rare earth-containing gas-phase super-stable Y zeolite, and
optionally, the rare earth-containing DASY zeolite.

Preferably, the weight ratio of the present rare earth-containing Y zeolite to the rare earth-containing gas-phase super-stable Y zeolite is 0.1-10, preferably 0.2-5, more preferably 0.25-5, e.g. 0.5-5 or 0.5-1.

In an embodiment, per 100 weight parts of catalytic cracking catalyst, said catalytic cracking catalyst comprises, substantially consists of or consists of:
36-43 weight parts of the clay,
25-32 weight parts of the binder,
10-21 weight parts of the present rare earth-containing Y zeolite,
2-6 weight parts of the rare earth-containing DASY zeolite, and
5-20 weight parts of the rare earth-containing gas-phase super-stable Y zeolite.

The Preparation Process for the Catalytic Cracking Catalyst

The present invention also provides a preparation method for the catalytic cracking catalyst, which comprises mixing and pulping the cracking active component, the optional mesoporous aluminosilicate material, the clay and the binder, and then spray-drying, washing, filtering and drying. These steps can be conducted according to the conventional methods. The preparation process has been discussed in detail in CN1916166A, CN1362472A, CN1727442A, CN1132898C, CN1727445A and CN1098130A, the contents of which are incorporated by reference herein.

EXAMPLES

Hereinafter, the present invention will be further illustrated with the examples, but the scope of the present invention is not limited thereto.

The First Y Zeolite

According to the present invention, the chemical composition of the zeolite is determined by X-ray fluorescence spectrometry. A reference can be made to Analytical Methods in Petrochemical Industry (RIPP Experiment Techniques), Yang Guiding et. al, Science Press, 1990.

The phase data (such as the unit cell size) and the crystallinity data of the molecular size are determined by X-ray diffraction according to the standard methods RIPP145-90 and RIPP146-90 respectively. A reference can be made to Analytical Methods in Petrochemical Industry (RIPP Experiment Techniques), Yang Cuiding et al, Science Press, 1990.

The Si/Al atom ratio in the skeleton of the zeolite is obtained by the nuclear magnetic resonance (NMR) measurement and calculation.

The light oil micro-activity (MA) is measured according to the standard method RIPP92-90.

In the Examples and Comparative Examples, the used starting materials are commercially available and their detailed specifications are as follows.

NaY zeolite, industrial grade, available from Sinopec Catalyst Company, Qilu Division.

Rare earth chloride: industrial grade, available from Sinopec Catalyst Company, Qilu Division, the mass ratio of lanthanum (as $La_2O_3$):cerium (as $Ce_2O_3$)=55:45;

Others: chemically pure.

Example 1

2.6 kg NaY zeolite (Qilu catalyst company, calcination loss by 22.5 wt %, Si/Al ratio 2.7, crystallinity 88%, the same below) and 15 kg deionized water were mixed and pulped. To the mixture were added 1.0 L of the rare earth chloride solution having a concentration of 160 g$RE_2O_3$/L and 0.24 kg ammonium chloride solid. After stirring, the slurry was warmed up to 70° C. and the slurry was adjusted with a diluted hydrochloric acid to a pH of 4.0, continued to exchange for 1.5 hours, filtered, water-washed, dired, then calcined in a condition of 100% steam at 550° C. for 2 hours to obtain the "one-exchange-and-one-calcination" rare earth- and sodium-containing Y zeolite Y-A1, Y-A1 having the following chemical composition: $Na_2O$ 5.1 wt %, rare earth oxide 7.8 wt %. Then a slurry was formulated and pulped in a ratio of zeolite:$NH_4Cl$:$H_2O$=1:0.2:10 and exchanged at 70° C. for 1 hour. To the slurry was added 0.27 L of the rare earth chloride solution having a concentration of 300 g$RE_2O_3$/L. The slurry was stirred evenly. To the slurry was added aqueous ammonia, and the slurry was adjusted to a pH of 7.5 and the stirring was continued for 10 minutes, filtered, water-washed, dried, then calcined in a condition of 100% steam at 600° C. for 2 hours to obtain the present rare earth-containing Y zeolite product, named as Y-A.

The X-ray diffraction spectrogram of Y-A was shown in FIG. 1.

Y-A: $Na_2O$ 1.5 wt %, rare earth oxide 11.9 wt %, crystallinity 50.1%, unit cell size 2.458 nm, the Si/Al atom ratio in the skeleton 3.5. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 90.0.

Example 2

2.6 kg NaY zeolite and 18 kg deionized water were mixed and pulped. To the mixture were added 1.25 L of the rare earth chloride solution having a concentration of 160 g$RE_2O_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in air at 570° C. for 2 hours to obtain the "one-exchange-and-one-calcination" rare earth- and sodium-containing Y zeolite Y-B1, Y-B1 having the following chemical composition: $Na_2O$ 4.9 wt %, rare earth oxide 9.9 wt %. Then a slurry was formulated and pulped in a ratio of zeolite:$NH_4Cl$:$H_2O$=1:0.3:10 and exchanged at 60° C. for 0.5 hour. To the slurry was added 0.13 L of the rare earth chloride solution having a concentration of 300 g$RE_2O_3$/L. The slurry was stirred evenly. To the slurry was added aqueous ammonia, and the slurry was adjusted to a pH of 7.8 and the stirring was continued for 10 minutes, filtered, water-washed, dried, then calcined in air at 570° C. for 2 hours to obtain the present rare earth-containing Y zeolite product, named as Y-B.

Y-B had a similar X-ray diffraction spectrogram as that shown in FIG. 1.

Y-B: $Na_2O$ 1.5 wt %, rare earth oxide 11.9 wt %, crystallinity 50.6%, unit cell size 2.463 nm, the Si/Al atom ratio in the skeleton 2.9. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 54.1.

Example 3

2.6 kg NaY zeolite and 18 kg deionized water were mixed and pulped. To the mixture were added 1.25 L of the rare earth chloride solution having a concentration of 160 g$RE_2O_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in a condition of 50% steam at 570° C. for 2 hours to obtain the "one-exchange-and-one-calcination" rare earth- and sodium-containing Y zeolite Y-C1, Y-C1 having the following chemical composition: $Na_2O$ 4.9 wt %, rare earth oxide 9.9 wt %. Then a slurry was formulated and pulped in a ratio of zeolite:$NH_4Cl$:$H_2O$=1:0.15:12 and exchanged at 75° C. for 1 hour. Then to the slurry was added 0.27 L of the rare earth chloride solution having a concentration of 300 g$RE_2O_3$/L. The slurry was stirred evenly. To the slurry was added sodium silicate, and the slurry was adjusted to a pH of 8.0 and the stirring was continued for 10 minutes, filtered, water-washed, dried, then calcined in air at 570° C. for 2 hours to obtain the present rare earth-containing Y zeolite product, named as Y-C.

Y-C had a similar X-ray diffraction spectrogram as that shown in FIG. 1.

Y-C: $Na_2O$ 1.3 wt %, rare earth oxide 13.9 wt %, crystallinity 48.8%, unit cell size 2.465 nm, the Si/Al atom ratio in the skeleton 3.1. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 55.6.

Example 4

2.6 kg NaY zeolite and 18 kg deionized water were mixed and pulped. To the mixture were added 1.25 L of the rare earth chloride solution having a concentration of 160 g$RE_2O_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in air at 600° C. for 1.5 hours to obtain the "one-exchange-and-one-calcination" rare earth- and sodium-containing Y zeolite Y-D1, Y-D1 having the following chemical composition: $Na_2O$ 4.9 wt %, rare earth oxide 9.9 wt %. Then Y-D1, ammonium chloride and the rare earth chloride solution having a concentration of 300 g$RE_2O_3$/L were mixed and pulped in a ratio of zeolite:$NH_4Cl$:$RE_2O_3$:$H_2O$=1:0.15:0.06:12 and exchanged at 75° C. for 1 hour. Then to the slurry was added sodium silicate, and the slurry was adjusted to a pH of 8.0 and the stirring was continued for 10 minutes, filtered, water-washed, dried, then calcined in a condition of 100% steam at 570° C. for 3 hours to obtain the present rare earth-containing Y zeolite product, named as Y-D.

Y-D had a similar X-ray diffraction spectrogram as that shown in FIG. 1.

Y-D: $Na_2O$ 1.3 wt %, rare earth oxide 16.0 wt %, crystallinity: 46.6%, unit cell size: 2.467 nm, the Si/Al atom ratio in the skeleton 3.0. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 57.2.

Example 5

2.6 kg NaY zeolite and 20 kg deionized water were mixed and pulped. To the mixture was added 1.5 L of the rare earth chloride solution having a concentration of 160 g$RE_2O_3$/L. After stirring, the slurry was warmed up to 75° C. and the slurry was adjusted with a diluted hydrochloric acid to a pH of 3.5, continued to exchange for 1 hour, filtered, water-washed, dired, then calcined in a condition of 100% steam at 600° C. for 2 hours to obtain the "one-exchange-and-one-calcination" rare earth- and sodium-containing Y zeolite Y-E1, Y-E1 having the following chemical composition: $Na_2O$ 4.8 wt %, rare earth oxide 11.9 wt %. Then a slurry was formulated and pulped in a ratio of zeolite:$NH_4Cl$:$H_2O$=1:0.3:10 and exchanged at 70° C. for 1 hour. Then to slurry was added 0.4 L of the rare earth chloride solution having a concentration of 300 g$RE_2O_3$/L. The slurry was stirred evenly. To the slurry was added aqueous ammonia, and the slurry was adjusted to a pH of 7.9 and the stirring was continued for 10 minutes, filtered, water-washed, dried, then calcined in a condition of 80% steam at 600° C. for 2 hours to obtain the present rare earth-containing Y zeolite product, named as Y-E.

Y-E had a similar X-ray diffraction spectrogram as that shown in FIG. 1.

Y-E: $Na_2O$ 1.3 wt %, rare earth oxide 17.9 wt %, crystallinity 45.2%, unit cell size 2.467 nm, the Si/Al atom ratio in the skeleton 3.2. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 62.6.

Example 6

2.6 kg NaY zeolite and 20 kg deionized water were mixed and pulped. To the mixture was added 1.5 L of the lanthanum chloride solution having a concentration of 160 gLa$_2$O$_3$/L. After stirring, the slurry was warmed up to 75° C. and the slurry was adjusted with a diluted hydrochloric acid to a pH of 3.5, continued to exchange for 1 hour, filtered, water-washed, dired, then calcined in air at 620° C. for 2 hours to obtain the "one-exchange-and-one-calcination" rare earth- and sodium-containing Y zeolite Y-F1, Y-F1 having the following chemical composition: Na$_2$O 4.8 wt %, lanthanum oxide 11.9 wt %. Then Y-F1, ammonium chloride and the lanthanum chloride solution were mixed and pulped in a ratio of zeolite:NH$_4$Cl:La$_2$O$_3$:H$_2$O=1:0.18:0.10:12 and exchanged at 65° C. for 1 hour. To the slurry was added aqueous ammonia, and the slurry was adjusted to a pH of 8.2 and the stirring was continued for 10 minutes, filtered, water-washed, dried, then calcined in a condition of 100% steam at 620° C. for 3 hours to obtain the present rare earth-containing Y zeolite product, named as Y-F.

Y-F had a similar X-ray diffraction spectrogram as that shown in FIG. 1.

Y-F: Na$_2$O 1.5 wt %, lanthanum oxide 22.0 wt %, crystallinity 41.3%, unit cell size 2.470 nm, the Si/Al atom ratio in the skeleton 3.1. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 70.1.

Example 11

2.6 kg NaY zeolite (Qilu catalyst company, calcination loss by 22.5 wt %, Si/Al ratio 2.7, crystallinity 88%, the same below) and 15 kg deionized water were mixed and pulped. To the mixture were added 1.0 L of the rare earth chloride solution having a concentration of 160 gRE$_2$O$_3$/L and 0.24 kg ammonium chloride solid. After stirring, the slurry was warmed up to 70° C. and the slurry was adjusted with a diluted hydrochloric acid to a pH of 4.0, continued to exchange for 1.5 hours, filtered, water-washed, dired, then calcined in a condition of 100% steam at 550° C. for 2 hours to obtain the "one-exchange-and-one-calcination" rare earth- and sodium-containing Y zeolite YY-A1, YY-A1 having the following chemical composition: Na$_2$O 5.1 wt %, rare earth oxide 7.8 wt %. Then a slurry was formulated and pulped in a ratio of zeolite:NH$_4$Cl:H$_2$O=1:0.2:10 and exchanged at 70° C. for 1 hour. After filtering and water-washing, the resulting material was re-pulped and to the slurry was added 0.27 L of the rare earth chloride solution having a concentration of 300 gRE$_2$O$_3$/L. The slurry was stirred evenly. To the slurry was added aqueous ammonia, and the slurry was adjusted to a pH of 7.5 and the stirring was continued for 10 minutes, optionally filtered and water-washed, dried, then calcined in a condition of 100% steam at 600° C. for 2 hours to obtain the present rare earth-containing Y zeolite product, named as YY-A.

YY-A: Na$_2$O 1.5 wt %, rare earth oxide 11.8 wt %, crystallinity: 50.3%, unit cell size: 2.458 nm, the Si/Al atom ratio in the skeleton 3.5. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 89.7.

Example 12

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in air at 570° C. for 2 hours to obtain the "one-exchange-and-one-calcination" rare earth- and sodium-containing Y zeolite YY-B1, YY-B1 having the following chemical composition: Na$_2$O 4.9 wt %, rare earth oxide 9.9 wt %. Then a slurry was formulated and pulped in a ratio of zeolite:HCl:H$_2$O=1:0.05:10 and exchanged at 60° C. for 0.5 hour. After filtering and water-washing, the resulting material was re-pulped and to the slurry was added 0.13 L of the rare earth chloride solution having a concentration of 300 gRE$_2$O$_3$/L. The slurry was stirred evenly. To the slurry was added aqueous ammonia, and the slurry was adjusted to a pH of 7.8 and the stirring was continued for 10 minutes, optionally filtered and water-washed, dried, then calcined in air at 570° C. for 2 hours to obtain the present rare earth-containing Y zeolite product, named as YY-B.

YY-B: Na$_2$O 1.5 wt %, rare earth oxide 11.9 wt %, crystallinity 50.6%, unit cell size 2.463 nm, the Si/Al atom ratio in the skeleton 2.9. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 48.8.

Example 13

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in a condition of 50% steam at 570° C. for 2 hours to obtain the "one-exchange-and-one-calcination" rare earth- and sodium-containing Y zeolite YY-C1, YY-C1 having the following chemical composition: Na$_2$O 4.9 wt %, rare earth oxide 9.9 wt %. Then a slurry was formulated and pulped in a ratio of zeolite:NH$_4$Cl:H$_2$O=1:0.15:12 and exchanged at 75° C. for 1 hour. After filtering and water-washing, the resulting material was re-pulped and to the slurry was added 0.27 L of the rare earth chloride solution having a concentration of 300 gRE$_2$O$_3$/L. The slurry was stirred evenly. To the slurry was added sodium silicate, and the slurry was adjusted to a pH of 8.0 and the stirring was continued for 10 minutes, optionally filtered and water-washed, dried, then calcined in air at 570° C. for 2 hours to obtain the present rare earth-containing Y zeolite product, named as YY-C.

YY-C: Na$_2$O 1.3 wt %, rare earth oxide 13.9 wt %, crystallinity 48.8%, unit cell size 2.465 nm, the Si/Al atom ratio in the skeleton 3.1. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 55.6.

Example 14

2.6 kg NaY zeolite and 18 kg deionized water ere mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dired, then calcined in air at 600° C. for 1.5 hours to obtain the "one-exchange-and-one-calcination" rare earth- and sodium-containing Y zeolite YY-D1, YY-D1 having the following chemical composition: $Na_2O$ 4.9 wt %, rare earth oxide 9.9 wt %. Then a slurry was formulated and pulped in a ratio of zeolite:$NH_4Cl$:$H_2O$=1:0.15:12 and exchanged at 75° C. for 1 hour. After filtering and water-washing, the resulting material was re-pulped and to the slurry was added 0.4 L of the rare earth chloride solution having a concentration of 300 g$RE_2O_3$/L. The slurry was stirred evenly. To the slurry was added sodium silicate, and the slurry was adjusted to a pH of 8.0 and the stirring was continued for 10 minutes, optionally filtered and water-washed, dried, then calcined in a condition of 100% steam at 570° C. for 3 hours to obtain the present rare earth-containing Y zeolite product, named as YY-D.

YY-D: $Na_2O$ 1.3 wt %, rare earth oxide 15.9 wt %, crystallinity 46.9%, unit cell size 2.466 nm, the Si/Al atom ratio in the skeleton 3.0. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 57.2.

Example 15

2.6 kg NaY zeolite and 20 kg deionized water were mixed and pulped. To the mixture was added 1.5 L of the rare earth chloride solution having a concentration of 160 g$RE_2O_3$/L. After stirring, the slurry was warmed up to 75° C. and the slurry was adjusted with a diluted hydrochloric acid to a pH of 3.5, continued to exchange for 1 hour, filtered, water-washed, dired, then calcined in a condition of 100% steam at 600° C. for 2 hours to obtain the "one-exchange-and-one-calcination" rare earth- and sodium-containing Y zeolite YY-E1, YY-E1 having the following chemical composition: $Na_2O$ 4.8 wt %, rare earth oxide 11.9 wt %. Then a slurry was formulated and pulped in a ratio of zeolite:$NH_4Cl$: $H_2O$=1:0.3:10 and exchanged at 70° C. for 1 hour. After filtering and water-washing, the resulting material was re-pulped and to the slurry was added 0.4 L of the rare earth chloride solution having a concentration of 300 g$RE_2O_3$/L. The slurry was stirred evenly. To the slurry was added aqueous ammonia, and the slurry was adjusted to a pH of 7.9 and the stirring was continued for 10 minutes, optionally filtered and water-washed, dried, then calcined in a condition of 80% steam at 600° C. for 2 hours to obtain the present rare earth-containing Y zeolite product, named as YY-E.

YY-E: $Na_2O$ 1.3 wt %, rare earth oxide 17.9 wt %, crystallinity 45.2%, unit cell size 2.467 nm, the Si/Al atom ratio in the skeleton 3.2. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 62.6.

Example 16

2.6 kg NaY zeolite and 20 kg deionized water were mixed and pulped. To the mixture was added 1.5 L of the lanthanum chloride solution having a concentration of 160 g$La_2O_3$/L. After stirring, the slurry was warmed up to 75° C. and the slurry was adjusted with a diluted hydrochloric acid to a pH of 3.5, continued to exchange for 1 hour, filtered, water-washed, dired, then calcined in air at 620° C. for 2 hours to obtain the "one-exchange-and-one-calcination" rare earth- and sodium-containing Y zeolite YY-F1, YY-F1 having the following chemical composition: $Na_2O$ 4.8 wt %, lanthanum oxide 11.9 wt %. Then a slurry was formulated and pulped in a ratio of zeolite:oxalic acid:$H_2O$=1:0.08:12 and exchanged at 65° C. for 1 hour. After filtering and water-washing, the resulting material was re-pulped and to the slurry was added 0.67 L of the lanthanum chloride solution having a concentration of 300 g$La_2O_3$/L. The slurry was stirred evenly. To the slurry was added aqueous ammonia, and the slurry was adjusted to a pH of 8.2 and the stirring was continued for 10 minutes, optionally filtered and water-washed, dried, then calcined in a condition of 100% steam at 620° C. for 3 hours to obtain the present rare earth-containing Y zeolite product, named as YY-F.

YY-F: $Na_2O$ 1.5 wt %, lanthanum oxide 21.9 wt %, crystallinity 41.7%, unit cell size 2.470 nm, the Si/Al atom ratio in the skeleton 3.1. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 70.1.

Comparative Example 1

In this Comparative Example, the rare earth-containing Y zeolite was prepared according to the method disclosed in CN1053808A.

2.6 kg NaY zeolite, 1.75 L of the rare earth chloride solution (160 g$RE_2O_3$/L) and 30 kg deionized water were mixed. The slurry was adjusted to a pH of 3.5 and exchanged at 90° C. for 1 hour. After stirring and water-washing, the filtered cake was placed in a tube-furnace. Upon heating up to 200° C., steam was passed in. The heating-up was continued to 550° C., and the calcination was conducted for 2 hours. The resulting zeolite, $(NH_4)_2SO_4$ and $H_2O$ were pulped in a ratio of 1:0.2:40, and the slurry was exchanged at 60° C. for 15 mins, filtered and dried to obtain a comparative sample, named as DB-1.

Figure 2:
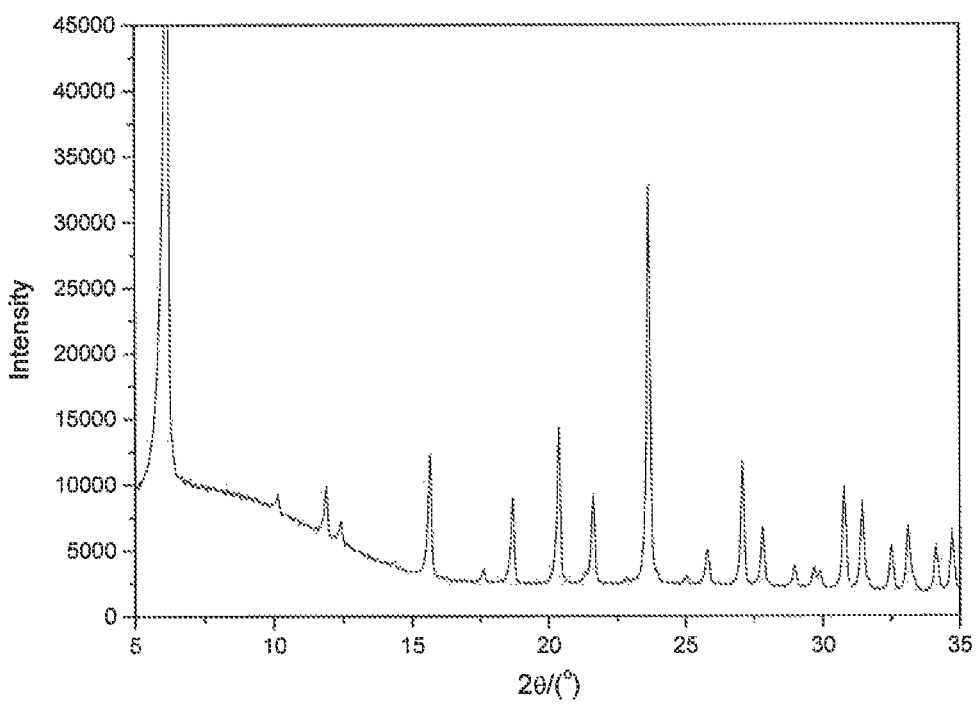
FIG. 2 is an X-ray diffraction spectrogram of spectrogram of the rare earth-containing Y zeolite prepared according to Comparative Example 1.

The X-ray diffraction spectrogram of DB-1 was shown in FIG. 2 DB-1: $Na_2O$ 1.3 wt %, rare earth oxide 12.1 wt %, crystallinity 56.7%, unit cell size 2.468 nm, the Si/Al atom ratio in the skeleton 4.2. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 15.7.

Comparative Example 2

In this Comparative Example, the rare earth-containing Y zeolite was prepared according to the conventional two-exchange-and-two-calcination method.

2.6 kg NaY zeolite, 3.0 L of the rare earth chloride solution (160 g$RE_2O_3$/L) and 20 kg deionized water were mixed, exchanged at 90° C. for 1 hour, filtered, water-washed, dried, calcined in air at 520° C. for 2 hours. The resulting zeolite, the rare earth chloride solution and $H_2O$ were pulped in a ratio of 1:0.12:10 and exchanged at 90° C. for 1 hour, filtered, dired, and calcined at 520° C. for 2 hours to obtain a comparative sample, named as DB-2.

DB-2 had a similar X-ray diffraction spectrogram as that shown in FIG. 2.

DB-2: $Na_2O$ 1.9 wt %, rare earth oxide 18.2 wt %, crystallinity 43.6%, unit cell size 2.469 nm, the Si/Al atom ratio in the skeleton 2.7. the product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 16.4.

Comparative Example 3

In this Comparative Example, the rare earth-containing Y zeolite was prepared according to the method disclosed in CN100344374C.

2.6 kg NaY zeolite and 20 kg deionized water were mixed and warmed up to 90° C. To the slurry was added 0.3 kg ammonium sulfate, and the resulting slurry was adjusted with hydrochloric acid to a pH of 3.5-4.0. The exchange was conducted for 1 hour. After filtering, to the filtered cake was added 20 kg water and then added 2.87 L of the rare earth chloride solution (160 g$RE_2O_3$/L). The slurry was pulped and adjusted with hydrochloric acid to a pH of 3.5-5.5. The slurry was stirred at room temperature for 1 hour. Then to the slurry was added aqueous ammonia, and stirred for 5 mins. After water-washing and drying, the calcination was conducted at 540° C. in 0.1/h WHSV steam for 1.5 hours. The calcined zeolite was washed with the ammonium chloride solution in a ratio of zeolite:ammonium salt:water=1:0.1:10 at 60° C. for 10 mins, and dried to obtain a comparative sample, named as DB-3.

DB-3 had a similar X-ray diffraction spectrogram as that shown in FIG. 2.

DB-3: $Na_2O$ 0.2 wt %, rare earth oxide 20.6 wt %, crystallinity 50.7%, unit cell size 2.472 nm, the Si/Al atom ratio in the skeleton 3.7. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 26.8.

Comparative Example 4

In this Comparative Example, the rare earth-containing Y zeolite was prepared according to the method disclosed in CN100344374C.

2.6 kg NaY zeolite and 20 kg deionized water were mixed and pulped. To the slurry was added 1.63 L of the rare earth chloride solution (160 g$RE_2O_3$/L). The resulting slurry was stirred at 60° C. for 5 mins and adjusted with hydrochloric acid to a pH of 3.5-5.5. After continuing to stir for 1 hour, to the slurry was added aqueous ammonia. The slurry was stirred for 5 mins and filtered. After water-washing and drying, the calcination was conducted at 600° C. in 0.2/h WHSV steam for 1.5 hours. The calcined zeolite was washed with the ammonium chloride solution in a ratio of zeolite:ammonium salt:water=1:0.1:10 at 90° C. for 10 mins, and dried to obtain a comparative sample, named as DB-4.

DB-4 had a similar X-ray diffraction spectrogram as that shown in FIG. 2.

DB-4: $Na_2O$ 0.8 wt %, rare earth oxide 11.8 wt %, crystallinity 56.5%, unit cell size 2.465 nm, the Si/Al atom ratio in the skeleton 3.3. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 40.1.

Comparative Example 5

In this Comparative Example, the rare earth-containing Y zeolite was prepared according to the method disclosed in CN100344374C.

2.6 kg NaY zeolite and 20 kg deionized water were mixed and pulped. To the slurry was added 2.19 L of the rare earth chloride solution (160 g$RE_2O_3$/L). The resulting slurry was stirred at 60° C. for 5 mins and adjusted with hydrochloric acid to a pH of 3.5-5.5. After continuing to stir for 1 hour, to the slurry was added aqueous ammonia. The slurry was stirred for 5 mins and filtered. After water-washing and drying, the calcination was conducted at 550° C. in air for 1.5 hours. The calcined zeolite was washed with the ammonium chloride solution in a ratio of zeolite:ammonium salt:water=1:0.1:10 at 60° C. for 10 mins, and dried to obtain a comparative sample, named as DB-5.

DB-5 had a similar X-ray diffraction spectrogram as that shown in FIG. 2.

DB-5: $Na_2O$ 1.0 wt %, rare earth oxide 15.7 wt %, crystallinity 52.9%, unit cell size 2.467 nm, the Si/Al atom ratio in the skeleton 3.6. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 30.9.

Example 21

In this example, the data about rare earth utilization of the rare earth-containing Y zeolites in Examples 1-6 and 11-16 and Comparative Examples 1-5 are summarized in Table 1.

TABLE 1

| Zeolite samples | Theoretical rare earth feeding amount/% | $RE_2O_3$ content in the product/% | Rare earth utilization/% |
| --- | --- | --- | --- |
| Y-A | 12.0 | 11.9 | 99.2 |
| Y-B | 12.0 | 11.9 | 99.2 |
| Y-C | 14.0 | 13.9 | 99.3 |
| Y-D | 16.0 | 16.0 | 100 |
| Y-E | 18.0 | 17.9 | 99.4 |
| Y-F | 22.0 | 22.0 | 100 |
| YY-A | 12.0 | 11.8 | 98.3 |
| YY-B | 12.0 | 11.9 | 99.2 |
| YY-C | 14.0 | 13.9 | 99.3 |
| YY-D | 16.0 | 15.9 | 99.4 |
| YY-E | 18.0 | 17.9 | 99.4 |
| YY-F | 22.0 | 21.9 | 99.5 |
| DB-1 | 14.0 | 12.1 | 86.4 |
| DB-2 | 24.0 | 18.2 | 75.8 |
| DB-3 | 23.0 | 20.6 | 89.6 |
| DB-4 | 13.0 | 11.8 | 90.7 |
| DB-5 | 17.5 | 15.7 | 89.7 |

It can be seen from the Table 1 that the rare earth utilization of each zeolite in the Examples is higher than 98%, while the rare earth utilization in Comparative Examples are lower. The rare earth utilization in Comparative Example 2 is only about 75%, others are substantially lower than 90%. By the process having the two-exchange-and-two-calcination in combination with the deposition of rare earth according to the present invention, the rare earth utilization is effectively increased, and the rare earth resource can be saved.

Example 22

This example will show the physichemical data for the rare earth-containing Y zeolite of the present invention after 17 hours aging treatment at 800° C. in a condition of 100% steam.

The zeolites in the above Examples and Comparative Examples ere mixed with the ammonium chloride solution, and exchanged until the content of $Na_2O$ is below 0.3 wt %. After filtering and drying, the zeolites were aged at 800° C. in a condition of 100% steam for 17 hours. The aged zeolites were measured for phycial-chemical characterization and for the light oil micro-activity MA.

The conditions for the light oil micro-activity (MA) include:
zeolite loading: 2 g,
the feedstock: Dagangstraightrun light diesel fuel
the feedstock amount: 1.56 g,
the reaction temperature: 460° C.
The results are shown in Table 2.

TABLE 2

| Zeolite samples | RE$_2$O$_3$ Content/% | Unit Cell Size/nm | Crystallinity Retention/% | MA |
|---|---|---|---|---|
| Y-A | 11.8 | 2.436 | 45.7 | 63.3 |
| Y-B | 11.9 | 2.436 | 45.9 | 63.3 |
| Y-C | 13.8 | 2.438 | 46.0 | 65.0 |
| Y-D | 15.9 | 2.439 | 47.0 | 67.2 |
| Y-E | 17.9 | 2.441 | 47.8 | 70.0 |
| Y-F | 21.9 | 2.445 | 46.3 | 72.1 |
| YY-A | 11.7 | 2.436 | 45.4 | 63.0 |
| YY-B | 11.8 | 2.436 | 45.9 | 63.0 |
| YY-C | 13.8 | 2.438 | 46.0 | 65.0 |
| YY-D | 16.9 | 2.439 | 46.3 | 67.0 |
| YY-E | 17.9 | 2.441 | 47.8 | 70.0 |
| YY-F | 21.8 | 2.445 | 46.0 | 72.0 |
| DB-1 | 11.8 | 2.433 | 27.1 | 56.1 |
| DB-2 | 17.1 | 2.438 | 35.0 | 65.2 |
| DB-3 | 19.5 | 2.441 | 39.6 | 68.0 |
| DB-4 | 11.3 | 2.433 | 34.9 | 56.4 |
| DB-5 | 14.9 | 2.436 | 38.4 | 63.0 |

It can be seen from Table 2 that for the zeolites in Examples, after ammonium-exchanging and sodium sodium-removal, their rare earth contents were substantially unchanged. This showed that the rare earth ions were mainly located in the sodalite cages of the zeolite and could not be reverse-exchanged out. The location of rare earth ions in sodalite cages had a significant stabilizing effect on the zeolite structure. The zeolites in Examples had a crystallinity retention of higher than 45%, and a light oil micro-activity higher than those in Comparative Examples having the comparable rare earth contents.

The Preparation and Evaluation of the Catalyst

In the following examples for preparing the catalysts, besides the zeolites YY-A, YY-C to YY-F and DB-1 to DB-5, the following materials were used.

Alumina sol was a product commercially available from Sinopec Catalyst Company Qilu Division having an Al$_2$O$_3$ content of 21.5 wt %.

Kaolin was a product commercially available from China Kaolin Company, Suzhou.

Pseudoboehmite was a product commercially available from Shandong Aluminum Factory.

Mesoporous aluminosilicate material was prepared according to the method disclosed in Example 1 of CN1854258A (SH-SA-1).

Rare earth-containing gas-phase ultra stable Y zeolite was prepared according to the method disclosed in Example 5 of CN1683244A.

Mg-containing ultra stable Y zeolite was prepared according to the method disclosed in Example 1 of CN1297018A.

MFI-structured zeolite was prepared according to the method disclosed in Example 1 of CN1611299A.

DASY2.0 zeolite was a product commercially available form Sinopec Catalyst Company Qilu Division, having a RE$_2$O$_3$ content of 2 wt % and a Si/Al atom molar ratio of 4.1.

In the evaluation of the catalyst, the conversion was calculated based on the following equation:

Conversion=(dry gas mass+LPG mass+FCCN mass+coke mass)/feed oil mass×100%

Group I

Catalyst Example 1

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 40 weight parts (dry basis) of the kaolin slurry and 9 weight parts (dry basis) of alumina sol. After stirring for 20 minutes, to the mixture was added 33 weight parts (dry basis) of the zeolite YY-A slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst C1.

Catalyst Example 2

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 34 weight parts (dry basis) of the kaolin slurry and 11 weight parts (dry basis) of alumina sol. After stirring for 20 minutes, to the mixture was added a mixed slurry of 31 weight parts (dry basis) of the zeolite YY-A and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst C2.

Catalyst Example 3

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 39 weight parts (dry basis) of the kaolin slurry and 11 weight parts (dry basis) of alumina sol. After stirring for 20 minutes, to the mixture was added a mixed slurry of 30 weight parts (dry basis) of the zeolite YY-C and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C3.

Catalyst Example 4

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 10 weight parts (dry basis) of alumina sol. After stirring for 20 minutes, to the mixture was added a mixed slurry of 28 weight parts (dry basis) of the zeolite YY-D and 3 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C4.

Catalyst Example 5

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 42 weight parts (dry basis) of the kaolin slurry and 9 weight parts (dry basis) of alumina sol. After stirring for 20 minutes, to the mixture was added a mixed slurry of 25 weight parts (dry basis) of the zeolite YY-E and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C5.

Catalyst Example 6

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 43 weight parts (dry basis) of the kaolin slurry and 10 weight parts (dry basis) of alumina sol. After stirring for 20 minutes, to the mixture was added a mixed slurry of 23 weight parts (dry basis) of the zeolite YY-F and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C6.

Catalyst Comparative Example 1

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 40 weight parts (dry basis) of the kaolin slurry and 9 weight parts (dry basis) of alumina sol. After stirring for 20 minutes, to the mixture was added 33 weight parts (dry basis) of the zeolite DB-1 slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-1.

Catalyst Comparative Example 2

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 10 weight parts (dry basis) of alumina sol. After stirring for 20 minutes, to the mixture was added a mixed slurry of 28 weight parts (dry basis) of the zeolite DB-2 and 3 weight parts of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-2.

Catalyst Comparative Example 3

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 42 weight parts (dry basis) of the kaolin slurry and 9 weight parts (dry basis) of alumina sol. After stirring for 20 minutes, to the mixture was added a mixed slurry of 25 weight parts (dry basis) of the zeolite DB-3 and 5 weight parts of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-3.

Catalyst Comparative Example 4

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 38 weight parts (dry basis) of the kaolin slurry and 9 weight parts (dry basis) of alumina sol. After stirring for 20 minutes, to the mixture was added 35 weight parts (dry basis) of the zeolite DB-4 slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-4.

Catalyst Comparative Example 5

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 35 weight parts (dry basis) of the kaolin slurry and 10 weight parts (dry basis) of alumina sol. After stirring for 20 minutes, to the mixture was added a mixed slurry of 30 weight parts (dry basis) of the zeolite DB-5 and 3 weight parts of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-5.

The above catalytic cracking catalysts C1-C6 and DC1-DC5 were aged at 800° C. in a condition of 100% steam for 12 hours. Then the catalysts were loaded into a small-scale fixed fluidised bed ACE unit (purchased from KTI Company, USA). The loading amount of each of the catalysts was 9 g. Then, the catalytic feedstock oil with the properties as shown in Table 3-1 was introduced to the fixed fluidised bed ACE device loaded with the catalytic cracking catalysts C1-C6 and DC1-DC5 respectively to conduct the catalytic cracking reaction at a temperature of 510° C. at a weight hourly space velocity of 12/h at a catalyst/oil ratio (by weight) of 6. The composition of reaction products was analyzed and the conversion was calculated. The results were shown in Table 4-1.

TABLE 3-1

| | |
|---|---|
| density(20° C.)/(kg/m$^3$) | 922.1 |
| freezing point/° C. | 33 |
| Residual Carbon/wt % | 3.66 |
| SARA composition/wt % | |
| Saturated hydrocarbons | 53.3 |
| Aromatic hydrocarbons | 31.5 |
| Resin | 14.5 |
| Asphaltene | 0.7 |
| Element Composition/wt % | |
| C | 86.51 |
| H | 12.72 |
| S | 0.35 |
| N | 0.18 |
| Metal content/(μg/g) | |
| Fe | 6.9 |
| Ni | 10.7 |
| V | 6.5 |
| Na | 0.1 |
| Ca | 1.7 |

TABLE 4-1

| | Dry gas (C2-) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|
| Catalyst Example 1 | 2.29 | 13.65 | 47.33 | 16.6 | 12.26 | 7.87 | 71.14 |
| Catalyst Example 2 | 2.14 | 13.52 | 47.18 | 16.75 | 12.61 | 7.8 | 70.64 |
| Catalyst Example 3 | 2.38 | 13.72 | 46.97 | 16.58 | 12.4 | 7.95 | 71.02 |
| Catalyst Example 4 | 2.37 | 14.46 | 48.65 | 15.17 | 11.53 | 7.82 | 73.3 |
| Catalyst Example 5 | 2.31 | 14.62 | 48.27 | 15.23 | 11.64 | 7.93 | 73.13 |
| Catalyst Example 6 | 2.29 | 14.71 | 47.96 | 15.37 | 11.85 | 7.82 | 72.78 |
| Catalyst Comparative Example 1 | 2.13 | 12.43 | 43.67 | 18.23 | 15.98 | 7.56 | 65.79 |
| Catalyst Comparative Example 2 | 2.28 | 13.48 | 46.53 | 16.99 | 12.89 | 7.83 | 70.12 |
| Catalyst Comparative Example 3 | 2.3 | 14.14 | 47.38 | 16.34 | 12.03 | 7.81 | 71.63 |
| Catalyst Comparative Example 4 | 2.27 | 13.48 | 46.79 | 16.52 | 13.1 | 7.84 | 70.38 |
| Catalyst Comparative Example 5 | 2.38 | 14.38 | 48.51 | 15.2 | 11.68 | 7.85 | 73.12 |

Group II

Catalyst Example 1

16 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 9 weight parts (dry basis) of alumina sol, and 4 weight parts (dry basis) of the mesoporous aluminosilicate slurry. After stirring for 20 minutes, to the mixture was added 34 weight parts (dry basis) of the zeolite YY-A slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C1.

Catalyst Example 2

17 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 020 to peptize. The mixture was warmed up to 65° C. and acidified for 1 hour. To the resulting mixture were respectively added 38 weight parts (dry basis) of the kaolin slurry and 9 weight parts (dry basis) of alumina sol, and 2 weight parts (dry basis) of the mesoporous aluminosilicate slurry. After stirring for 20 minutes, to the mixture was added a mixed slurry of 32 weight parts (dry basis) of the zeolite YY-A and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C2.

Catalyst Example 3

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 20 weight parts (dry basis) of the kaolin slurry and 11 weight parts (dry basis) of alumina sol, and 12 weight parts (dry basis) of the mesoporous aluminosilicate slurry After stirring for 20 minutes, to the mixture was added a mixed slurry of 26 weight parts (dry basis) of the zeolite YY-C and 9 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C3.

Catalyst Example 4

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 26 weight parts (dry basis) of the kaolin slurry and 10 weight parts (dry basis) of alumina sol, and 8 weight parts (dry basis) of the mesoporous aluminosilicate slurry. After stirring for 20 minutes, to the mixture was added a mixed slurry of 30 weight parts (dry basis) of the zeolite YY-D and 4 weight parts (dry basis) of the DASY2.0 zeolite. After stirring for 30 mins, the resulting slurry having a solid content of 30% was spray-dried to produce the microsphere catalyst. The microsphere catalyst was calcined at 500° C.

for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C4.

Catalyst Example 5

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 10 weight parts (dry basis) of alumina sol, and 6 weight parts (dry basis) of the mesoporous aluminosilicate slurry. After stirring for 20 minutes, to the mixture was added a mixed slurry of 26 weight parts (dry basis) of the zeolite YY-E and 8 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C5.

Catalyst Example 6

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 40 weight parts (dry basis) of the kaolin slurry and 8 weight parts (dry basis) of alumina sol, and 5 weight parts (dry basis) of the mesoporous aluminosilicate slurry. After stirring for 20 minutes, to the mixture was added 29 weight parts (dry basis) of the zeolite YY-F slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C6.

Catalyst Comparative Example 1

16 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 9 weight parts (dry basis) of alumina sol, and 4 weight parts (dry basis) of the mesoporous aluminosilicate slurry. After stirring for 20 minutes, to the mixture was added 34 weight parts (dry basis) of the zeolite DB-1 slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-1.

Catalyst Comparative Example 2

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 020 to peptize. The mixture was warmed up to 65° C. and acidified for 1 hour. To the resulting mixture were respectively added 26 weight parts (dry basis) of the kaolin slurry and 10 weight parts (dry basis) of alumina sol, and 8 weight parts (dry basis) of the mesoporous aluminosilicate slurry. After stirring for 20 minutes, to the mixture was added a mixed slurry of 30 weight parts (dry basis) of the zeolite DB-2 and 4 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-2.

Catalyst Comparative Example 3

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 10 weight parts (dry basis) of alumina sol, and 6 weight parts (dry basis) of the mesoporous aluminosilicate slurry. After stirring for 20 minutes, to the mixture was added a mixed slurry of 26 weight parts (dry basis) of the zeolite DB-3 and 8 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. (($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-3.

Catalyst Comparative Example 4

16 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 34 weight parts (dry basis) of the kaolin slurry and 9 weight parts (dry basis) of alumina sol, and 4 weight parts (dry basis) of the mesoporous aluminosilicate slurry. After stirring for 20 minutes, to the mixture was added 37 weight parts (dry basis) of the zeolite DB-4 slurry. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. (($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-4.

Catalyst Comparative Example 5

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 23 weight parts (dry basis) of the kaolin slurry and 10 weight parts (dry basis) of alumina sol, and 8 weight parts (dry basis) of the mesoporous aluminosilicate slurry. After stirring for 20 minutes, to the mixture was added a mixed slurry of 33 weight parts (dry basis) of the zeolite DB-5 and 4 weight parts of the DASY2.0 zeolite After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. (($(NH_4)_2SO_4$ solution: microsphere catalyst: $H_2O$ weight ratio=0.05:1:10) until the $Na_2O$ content was less than 0.25 wt %. Finally, the catalyst was rinsed with dionized water (microsphere catalyst: $H_2O$ weight ratio=1:10), filtered, and dried at 110° C. to obtain the catalytic cracking catalyst DC-5.

The above catalytic cracking catalysts C1-C6 and DC1-DC5 were aged at 800° C. in a condition of 100% steam for 12 hours. Then the catalysts were loaded into a small-scale fixed fluidised bed ACE unit (purchased from KTI Company, USA). The loading amount of each of the catalysts was 9 g. Then, the catalytic feedstock oil with the properties as shown in Table 3-2 was introduced to the fixed fluidised bed ACE device loaded with the catalytic cracking catalysts C1-C6 and DC1-DC5 respectively to conduct the catalytic cracking reaction at a temperature of 510° C. at a weight hourly space velocity of 12/h at a catalyst/oil ratio (by weight) of 6. The composition of reaction products was analyzed and the conversion was calculated. The results were shown in Table 4-2.

TABLE 3-2

| | |
|---|---|
| density(20° C.)/(kg/m³) | 922.1 |
| freezing point/° C. | 33 |
| Residual Carbon/wt % | 3.66 |
| SARA composition/wt % | |
| Saturated hydrocarbons | 53.3 |
| Aromatic hydrocarbons | 31.5 |
| Resin | 14.5 |
| Asphaltene | 0.7 |
| Element Composition/wt % | |
| C | 86.51 |
| H | 12.72 |
| S | 0.35 |
| N | 0.18 |
| Metal content/(μg/g) | |
| Fe | 6.9 |
| Ni | 10.7 |
| V | 6.5 |
| Na | 0.1 |
| Ca | 1.7 |

TABLE 4-2

| | Dry gas (C2-) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|
| Catalyst Example 1 | 2.31 | 13.91 | 48.25 | 16.41 | 11.2 | 7.92 | 72.39 |
| Catalyst Example 2 | 2.29 | 13.88 | 47.98 | 16.58 | 11.38 | 7.89 | 72.04 |
| Catalyst Example 3 | 2.4 | 13.86 | 48.3 | 16.92 | 10.54 | 7.98 | 72.54 |
| Catalyst Example 4 | 2.43 | 14.8 | 50.51 | 14.66 | 9.22 | 8.38 | 76.12 |
| Catalyst Example 5 | 2.42 | 14.65 | 50.62 | 14.71 | 9.3 | 8.3 | 75.99 |
| Catalyst Example 6 | 2.29 | 13.38 | 46.85 | 17.28 | 12.07 | 8.13 | 70.65 |
| Catalyst Comparative Example 1 | 2.17 | 12.54 | 44.26 | 18.1 | 15.42 | 7.51 | 66.48 |
| Catalyst Comparative Example 2 | 2.38 | 13.8 | 48.41 | 15.34 | 11.7 | 8.37 | 72.96 |
| Catalyst Comparative Example 3 | 2.45 | 14.07 | 49.07 | 14.55 | 11.43 | 8.43 | 74.02 |
| Catalyst Comparative Example 4 | 2.3 | 13.87 | 47.59 | 16.61 | 11.52 | 8.11 | 71.87 |
| Catalyst Comparative Example 5 | 2.52 | 14.77 | 50.24 | 14.38 | 9.54 | 8.55 | 76.08 |

Group III

Catalyst Example 1

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 40 weight parts (dry basis) of the kaolin slurry and 8 weight parts (dry basis) of alumina sol. After stirring for 20 minutes, to the mixture was added a mixed slurry of 18 weight parts (dry basis) of the zeolite YY-A and 12 weight parts (dry basis) of the rare earth-containing gas-phase ultra stable Y zeolite and 10 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C1.

Catalyst Example 2

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 39 weight parts (dry basis) of the kaolin slurry and 9 weight parts (dry basis) of alumina sol. After stirring for 20 minutes, to the mixture was added a mixed slurry of 15 weight parts (dry basis) of the zeolite YY-A and 15 weight parts (dry basis) of the rare earth-containing gas-phase ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C2.

Catalyst Example 3

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 42 weight parts (dry basis) of the kaolin slurry and 8 weight parts (dry basis) of alumina sol. After stirring for 20 minutes, to the mixture was added a mixed slurry of 10 weight parts (dry basis) of the zeolite YY-C and 20 weight parts (dry basis) of the rare earth-containing gas-phase ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C3.

Catalyst Example 4

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 36 weight parts (dry basis) of the kaolin slurry and 10 weight parts (dry basis) of alumina sol. After stirring for 20 minutes, to the mixture was added a mixed slurry of 21 weight parts (dry basis) of the zeolite YY-D and 5 weight parts (dry basis) of the rare earth-containing gas-phase ultra stable Y zeolite and 6 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C4.

Catalyst Example 5 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 41 weight parts (dry basis) of the kaolin slurry and 9 weight parts (dry basis) of alumina sol. After stirring for 20 minutes, to the mixture was added a mixed slurry of 18 weight parts (dry basis) of the zeolite YY-E and 9 weight parts (dry basis) of the rare earth-containing gas-phase ultra stable Y zeolite and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C5.

Catalyst Example 6

17 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 43 weight parts (dry basis) of the kaolin slurry and 8 weight parts (dry basis) of alumina sol. After stirring for 20 minutes, to the mixture was added a mixed slurry of 16 weight parts (dry basis) of the zeolite YY-F and 12 weight parts (dry basis) of the rare earth-containing gas-phase ultra stable Y zeolite and 4 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C6.

Catalyst Comparative Example 1

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 40 weight parts (dry basis) of the kaolin slurry and 8 weight parts (dry basis) of alumina sol. After stirring for 20 minutes, to the mixture was added a mixed slurry of 18 weight parts (dry basis) of the zeolite DB-1 and 12 weight parts (dry basis) of the rare earth-containing gas-phase ultra stable Y zeolite and 10 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-1.

Catalyst Comparative Example 2

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 36 weight parts (dry basis) of the kaolin slurry and 10 weight parts (dry basis) of alumina sol. After stirring for 20 minutes, to the mixture was added a mixed slurry of 21 weight parts (dry basis) of the zeolite DB-2 and 5 weight parts (dry basis) of the rare earth-containing gas-phase ultra stable Y zeolite and 6 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-2.

Catalyst Comparative Example 3

18 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 41 weight parts (dry basis) of the kaolin slurry and 9 weight parts (dry basis) of alumina sol. After stirring for 20 minutes, to the mixture was added a mixed slurry of 18 weight parts (dry basis) of the zeolite DB-3 and 9 weight parts (dry basis) of the rare earth-containing gas-phase ultra stable Y zeolite and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-3.

Catalyst Comparative Example 4

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 38 weight parts (dry basis) of the kaolin slurry and 8 weight parts (dry basis) of alumina sol. After stirring for 20 minutes, to the mixture was added a mixed slurry of 20 weight parts (dry basis) of the zeolite DB-4 and 12 weight parts (dry basis) of the rare earth-containing gas-phase ultra stable Y zeolite and 3 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: H₂O weight ratio=1:10), filtered, and dried at 110° C. to obtain the catalytic cracking catalyst DC-4.

Catalyst Comparative Example 5

22 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 34 weight parts (dry basis) of the kaolin slurry and 10 weight parts (dry basis) of alumina sol. After stirring for 20 minutes, to the mixture was added a mixed slurry of 23 weight parts (dry basis) of the zeolite DB-5 and 5 weight parts (dry basis) of the rare earth-containing gas-phase ultra stable Y zeolite and 6 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: H₂O weight ratio=0.05:1:10) until the Na₂O content was less than 0.25 wt %. Finally, the catalyst was rinsed with deionized water (microsphere catalyst: H₂O weight ratio=1:10), filtered, and dried at 110° C. to obtain the catalytic cracking catalyst DC-5.

Catalyst Reference Example 1

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 39 weight parts (dry basis) of the kaolin slurry and 9 weight parts (dry basis) of alumina sol. After stirring for 20 minutes, to the mixture was added a mixed slurry of 0 weight parts (dry basis) of the zeolite YY-A and 30 weight parts (dry basis) of the rare earth-containing gas-phase super-stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: H₂O weight ratio=0.05:1:10) until the Na₂O content was less than 0.25 wt %. Finally, the catalyst was rinsed with deionized water (microsphere catalyst: H₂O weight ratio=1:10), filtered, and dried at 110° C. to obtain the catalytic cracking catalyst R1.

Catalyst Reference Example 2

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 39 weight parts (dry basis) of the kaolin slurry and 9 weight parts (dry basis) of alumina sol. After stirring for 20 minutes, to the mixture was added a mixed slurry of 30 weight parts (dry basis) of the zeolite YY-A and 0 weight parts (dry basis) of the rare earth-containing gas-phase super-stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: H₂O weight ratio=0.05:1:10) until the Na₂O content was less than 0.25 wt %. Finally, the catalyst was rinsed with deionized water (microsphere catalyst: H₂O weight ratio 1:10), filtered, and dried at 110° C. to obtain the catalytic cracking catalyst R2.

The above catalytic cracking catalysts R1-R2, C1-C6 and DC1-DC5 were aged at 800° C. in a condition of 100% steam for 12 hours, and then loaded in a fixed fluidised bed (FFB) equipment (provided by Dadi Company, RIPP, Sinopec) to evaluate the reaction performance of the catalytic cracking catalyst. The loading amount of the catalyst was 150 g. Then, the feedstock oil with the properties as shown in Table 3-3 was introduced to the EBB device to conduct the catalytic cracking reaction at a temperature of 520° C. at a weight hourly space velocity of 16/h at a catalyst/oil ratio (by weight) of 6. The composition of reaction products was analyzed and the conversion was calculated. The results were shown in Table 4-3.

TABLE 3-3

| | |
|---|---|
| density(20° C.)/(kg/m³) | 917.1 |
| freezing point/° C. | 20 |
| Residual Carbon/wt % | 1.91 |
| SARA composition/wt % | |
| Saturated hydrocarbons | 59.6 |
| Aromatic hydrocarbons | 27.3 |
| Resin | 13.1 |
| Asphaltene | <0.1 |
| Element Composition/wt % | |
| C | 85.96 |
| H | 12.37 |
| S | 1.0 |
| N | 0.35 |
| Metal content/(μg/g) | |
| Al | 4.9 |
| Ca | 8.3 |
| Fe | 12.3 |
| Na | 0.9 |
| Ni | 4.7 |
| V | 0.4 |

TABLE 4-3

|  | Dry gas (C2-) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|
| Catalyst Example 1 | 1.72 | 14.69 | 49.5 | 15.69 | 10.92 | 7.48 | 73.39 |
| Catalyst Example 2 | 1.66 | 14.48 | 48.74 | 15.73 | 11.99 | 7.4 | 72.28 |
| Catalyst Example 3 | 1.76 | 15.07 | 50.4 | 15.1 | 9.99 | 7.68 | 74.91 |
| Catalyst Example 4 | 1.75 | 15.45 | 50.56 | 14.7 | 9.87 | 7.67 | 75.43 |
| Catalyst Example 5 | 1.71 | 15.01 | 50.75 | 14.86 | 10.02 | 7.65 | 75.12 |
| Catalyst Example 6 | 1.72 | 15.09 | 50.73 | 14.9 | 9.85 | 7.71 | 75.25 |
| Catalyst Comparative Example 1 | 1.66 | 14.76 | 45.94 | 16.65 | 13.74 | 7.25 | 69.61 |
| Catalyst Comparative Example 2 | 1.8 | 15.32 | 46.03 | 16.18 | 13.24 | 7.43 | 70.58 |
| Catalyst Comparative Example 3 | 1.74 | 14.77 | 48.61 | 15.2 | 12.17 | 7.51 | 72.63 |
| Catalyst Comparative Example 4 | 1.75 | 14.73 | 48.9 | 15.67 | 11.39 | 7.56 | 72.94 |
| Catalyst Comparative Example 5 | 1.84 | 15.65 | 49.2 | 14.9 | 10.61 | 7.8 | 74.49 |
| Catalyst Reference Example 1 | 1.71 | 14.05 | 46.42 | 16.91 | 13.77 | 7.14 | 69.32 |
| Catalyst Reference Example 2 | 1.8 | 14.76 | 48.32 | 15.91 | 11.56 | 7.65 | 72.53 |

Group IV

Catalyst Example 1

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 7 weight parts (dry basis) of alumina sol. After stirring for 20 minutes, to the mixture was added a mixed slurry of 18 weight parts (dry basis) of the zeolite YY-A and 17 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C1.

Catalyst Example 2

16 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 39 weight parts (dry basis) of the kaolin slurry and 9 weight parts (dry basis) of alumina sol. After stirring for 20 minutes, to the mixture was added a mixed slurry of 25 weight parts (dry basis) of the zeolite YY-A and 8 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C2.

Catalyst Example 3

17 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 38 weight parts (dry basis) of the kaolin slurry and 8 weight parts (dry basis) of alumina sol. After stirring for 20 minutes, to the mixture was added a mixed slurry of 20 weight parts (dry basis) of the zeolite YY-C and 10 weight parts (dry basis) of the Mg-containing ultra stable Y zeolite and 7 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C3.

Catalyst Example 4

24 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 29 weight parts (dry basis) of the kaolin slurry and 10 weight parts (dry basis) of alumina sol. After stirring for 20 minutes, to the mixture was added a mixed slurry of 17 weight parts (dry basis) of the zeolite YY-D and 15 weight parts (dry basis) of the Mg-containing ultra stable Y zeolite and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C4.

Catalyst Example 5

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 34 weight parts (dry basis) of the kaolin slurry and 9 weight parts (dry basis) of alumina sol. After stirring for 20 minutes, to the mixture was added a mixed slurry of 15 weight parts (dry basis) of the zeolite YY-E and 21 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C5.

Catalyst Example 6

15 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 44 weight parts (dry basis) of the kaolin slurry and 6 weight parts (dry basis) of alumina sol. After stirring for 20 minutes, to the mixture was added a mixed slurry of 22 weight parts (dry basis) of the zeolite YY-F and 9 weight parts (dry basis) of the Mg-containing ultra stable Y zeolite and 4 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C6.

Catalyst Comparative Example 1

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 35 weight parts (dry basis) of the kaolin slurry and 7 weight parts (dry basis) of alumina sol. After stirring for 20 minutes, to the mixture was added a mixed slurry of 20 weight parts (dry basis) of the zeolite DB-1 and 17 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-1.

Catalyst Comparative Example 2

24 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 28 weight parts (dry basis) of the kaolin slurry and 10 weight parts (dry basis) of alumina sol. After stirring for 20 minutes, to the mixture was added a mixed slurry of 18 weight parts (dry basis) of the zeolite DB-2 and 15 weight parts (dry basis) of the Mg-containing ultra stable Y zeolite and 5 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-2.

Catalyst Comparative Example 3

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 33 weight parts (dry basis) of the kaolin slurry and 9 weight parts (dry basis) of alumina sol. After stirring for 20 minutes, to the mixture was added a mixed slurry of 16 weight parts (dry basis) of the zeolite DB-3 and 21 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-3.

Catalyst Comparative Example 4

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 35 weight parts (dry basis) of the kaolin slurry and 7 weight parts (dry basis) of alumina sol. After stirring for 20 minutes, to the mixture was added a mixed slurry of 20 weight parts (dry basis) of the zeolite DB-4 and 17 weight parts (dry basis) of the Mg-containing ultra stable Y zeolite and 2 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-4.

Catalyst Comparative Example 5

17 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 37 weight parts (dry basis) of the kaolin slurry and 8 weight parts (dry basis) of alumina sol. After stirring for 20 minutes, to the mixture was added a mixed slurry of 21 weight parts (dry basis) of the zeolite DB-5 and 10 weight parts (dry basis) of the Mg-containing ultra stable Y zeolite and 7 weight parts (dry basis) of the DASY2.0 zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-5.

The above catalytic cracking catalysts C1-C6 and DC1-DC5 were aged at 800° C. in a condition of 100% steam for 17 hours, and then loaded in a fixed fluidised bed (FFB) equipment (provided by Dadi Company, RIPP, Sinopec) to evaluate the reaction performance of the catalytic cracking catalyst. The loading amount of the catalyst was 150 g. Then, the feedstock oil with the properties as shown in Table 3-4 was introduced to the FBB device to conduct the catalytic cracking reaction at a temperature of 500° C. at a weight hourly space velocity of 16/h at a catalyst/oil ratio (by weight) of 5. The composition of reaction products was analyzed and the conversion was calculated. The results were shown in Table 4-4.

TABLE 3-4

| | |
|---|---|
| density(20° C.)/(kg/m³) | 917.1 |
| freezing point/° C. | 20 |
| Residual Carbon/wt % | 1.91 |
| SARA composition/wt % | |
| Saturated hydrocarbons | 59.6 |
| Aromatic hydrocarbons | 27.3 |
| Resin | 13.1 |
| Asphaltene | <0.1 |
| Element Composition/wt % | |
| C | 85.96 |
| H | 12.37 |
| S | 1.0 |
| N | 0.35 |
| Metal content/(μg/g) | |
| Al | 4.9 |
| Ca | 8.3 |
| Fe | 12.3 |
| Na | 0.9 |
| Ni | 4.7 |
| V | 0.4 |

TABLE 4-4

| | Dry gas (C2-) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|
| Catalyst Example 1 | 1.25 | 12.23 | 43.58 | 20.07 | 17.21 | 5.66 | 62.72 |
| Catalyst Example 2 | 1.24 | 12.17 | 43.46 | 19.99 | 17.5 | 5.64 | 62.51 |
| Catalyst Example 3 | 1.31 | 12.38 | 43.49 | 19.92 | 17.17 | 5.73 | 62.91 |
| Catalyst Example 4 | 1.26 | 12.38 | 43.75 | 19.87 | 17.02 | 5.72 | 63.18 |
| Catalyst Example 5 | 1.32 | 12.68 | 44.54 | 19.64 | 16.03 | 5.79 | 64.33 |
| Catalyst Example 6 | 1.33 | 12.55 | 44.09 | 19.52 | 16.67 | 5.84 | 63.81 |
| Catalyst Comparative Example 1 | 1.29 | 12.16 | 42.91 | 19.74 | 18.13 | 5.77 | 62.13 |
| Catalyst Comparative Example 2 | 1.31 | 12.37 | 43.54 | 19.51 | 17.46 | 5.81 | 63.03 |
| Catalyst Comparative Example 3 | 1.34 | 12.57 | 44.07 | 19.48 | 16.66 | 5.88 | 63.86 |
| Catalyst Comparative Example 4 | 1.33 | 12.2 | 42.93 | 19.63 | 18.12 | 5.79 | 62.25 |
| Catalyst Comparative Example 5 | 1.32 | 12.31 | 43.41 | 19.46 | 17.77 | 5.73 | 62.77 |

Group V

Catalyst Example 1

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 27 weight parts (dry basis) of the kaolin slurry and 10 weight parts (dry basis) of alumina sol and 8 weight parts (dry basis) of the mesoporous aluminosilicate slurry. After stirring for 20 minutes, to the mixture was added a mixed slurry of 23 weight parts (dry basis) of the zeolite YY-A and 4 weight parts (dry basis) of the DASY2.0 zeolite and 8 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C1.

Catalyst Example 2

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 34 weight parts (dry basis) of the kaolin slurry and 9 weight parts (dry basis) of alumina sol and 3 weight parts (dry basis) of the mesoporous aluminosilicate slurry. After stirring for 20 minutes, to the mixture was added a mixed slurry of 28 weight parts (dry basis) of the zeolite YY-A and 2 weight parts (dry basis) of the DASY2.0 zeolite and 5 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C2.

Catalyst Example 3

18 weight parts (dry basis) of pseudoboehmite and deionized water ere mixed and pulped to obtain a slurry. To the resulting slurry was added hydrochloric acid (having a concentration of 36 wt A) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 33 weight parts (dry basis) of the kaolin slurry and 10 weight parts (dry basis) of alumina sol and 4 weight parts (dry basis) of the mesoporous aluminosilicate slurry. After stirring for 20 minutes, to the mixture was added a mixed slurry of 27 weight parts (dry basis) of the zeolite YY-C and 2 weight parts (dry basis) of the DASY2.0 zeolite and 6 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C3.

Catalyst Example 4

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 10 weight parts (dry basis) of alumina sol and 3 weight parts (dry basis) of the mesoporous aluminosilicate slurry. After stirring for 20 minutes, to the mixture was added a mixed slurry of 24 weight parts (dry basis) of the zeolite YY-D and 3 weight parts (dry basis) of the DASY2.0 zeolite and 8 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst C4.

Catalyst Example 5

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 9 weight parts (dry basis) of alumina sol and 5 weight parts (dry basis) of the mesoporous aluminosilicate slurry. After stirring for 20 minutes, to the mixture was added a mixed slurry of 22 weight parts (dry basis) of the zeolite YY-E and 8 weight parts (dry basis) of the DASY2.0 zeolite and 5 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst C5.

Catalyst Example 6

16 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 020 to peptize. The mixture was warmed up to 65° C. and acidified for 1 hour. To the resulting mixture were respectively added 38 weight parts (dry basis) of the kaolin slurry and 7 weight parts (dry basis) of alumina sol and 4 weight parts (dry basis) of the mesoporous aluminosilicate slurry. After stirring for 20 minutes, to the mixture was added a mixed slurry of 20 weight parts (dry basis) of the zeolite YY-F and 5 weight parts (dry basis) of the DASY2.0 zeolite and 10 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst C6.

Catalyst Comparative Example 1

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 27 weight parts (dry basis) of the kaolin slurry and 10 weight parts (dry basis) of alumina sol and 8 weight parts (dry basis) of the mesoporous aluminosilicate slurry. After stirring for 20 minutes, to the mixture was added a mixed slurry of 23 weight parts (dry basis) of the zeolite DB-1 and 4 weight parts (dry basis) of the DASY2.0 zeolite and 8 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-1.

Catalyst Comparative Example 2

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 10 weight parts (dry basis) of alumina sol and 3 weight parts (dry basis) of the mesoporous aluminosilicate slurry. After stirring for 20 minutes, to the mixture was added a mixed slurry of 24 weight parts (dry basis) of the zeolite DB-2 and 3 weight parts (dry basis) of the DASY2.0 zeolite and 8 weight parts (dry basis) of MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-2.

Catalyst Comparative Example 3

19 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 32 weight parts (dry basis) of the kaolin slurry and 9 weight parts (dry basis) of alumina sol and 5 weight parts (dry basis) of the mesoporous aluminosilicate slurry. After stirring for 20 minutes, to the mixture was added a mixed slurry of 22 weight parts (dry basis) of the zeolite DB-3 and 8 weight parts (dry basis) of the DASY2.0 zeolite and 5 weight parts (dry basis) of MR-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a (NH$_4$)$_2$SO$_4$ solution at 60° C. ((NH$_4$)$_2$SO$_4$ solution: microsphere catalyst: H$_2$O weight ratio=0.05:1:10) until the Na$_2$O content was less than 0.25 wt %. Finally, the catalyst was rinsed with deionized water (microsphere catalyst: H$_2$O weight ratio=1:10), filtered, and dried at 110° C. to obtain the catalytic cracking catalyst DC-3.

Catalyst Comparative Example 4

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 25 weight parts (dry basis) of the kaolin slurry and 10 weight parts (dry basis) of alumina sol and 8 weight parts (dry basis) of the mesoporous aluminosilicate slurry. After stirring for 20 minutes, to the mixture was added a mixed slurry of 25 weight parts (dry basis) of the zeolite DB-4 and 4 weight parts (dry basis) of the DASY2.0 zeolite and 8 weight parts (dry basis) of MR-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=0.05:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-4.

Catalyst Comparative Example 5

20 weight parts (dry basis) of pseudoboehmite and deionized water were mixed and pulped to obtain a slurry. To the resulting slurry was added hydrochloric acid (having a concentration of 36 wt %) with an acid/alumina ratio (the weight ratio of said hydrochloric acid having a concentration of 36 wt % to pseudoboehmite as alumina) of 0.20 to peptize. The mixture was warmed up to 65° C. and acidified for 1 hour. To the resulting mixture were respectively added 30 weight parts (dry basis) of the kaolin slurry and 10 weight parts (dry basis) of alumina sol and 3 weight parts (dry basis) of the mesoporous aluminosilicate slurry. After stirring for 20 minutes, to the mixture was added a mixed slurry of 26 weight parts (dry basis) of the zeolite DB-5 and 3 weight parts (dry basis) of the DASY2.0 zeolite and 8 weight parts (dry basis) MFI-structured zeolite. After stirring for 30 mins, the resulting slurry having a solid content of 30% was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst: $H_2O$ weight ratio=005:1:10) until the $Na_2O$ content was less than 0.25 wt %. Finally, the catalyst was rinsed with deionized water (microsphere catalyst: $H_2O$ weight ratio=1:10), filtered, and dried at 110° C. to obtain the catalytic cracking catalyst DC-5.

The above catalytic cracking catalysts C1-C6 and DC1-DC5 were aged at 800° C. in a condition of 100% steam for 17 hours, and then loaded in a fixed fluidised bed (FFB) equipment (provided by Dadi Company, RIPP, Sinopec) to evaluate the reaction performance of the catalytic cracking catalyst. The loading amount of the catalyst was 150 g. Then, the feedstock oil with the properties as shown in Table 3-5 was introduced to the FBB device to conduct the catalytic cracking reaction at a temperature of 510° C. at a weight hourly space velocity of 12/h at a catalyst/oil ratio (by weight) of 6. The composition of reaction products was analyzed and the conversion was calculated. The results were shown in Table 4-5.

TABLE 3-5

| | |
|---|---|
| density(20° C.)/(kg/m³) | 914.8 |
| viscosity(80° C.) | 20.37 |
| Residual Carbon/wt % | 5.74 |
| SARA composition/wt % | |
| Saturated hydrocarbons | 58.0 |
| Aromatic hydrocarbons | 22.7 |
| Resin | 16.1 |
| Asphaltene | 3.2 |
| Element Composition/wt % | |
| C | 86.84 |
| H | 12.36 |
| S | 0.16 |
| N | 0.22 |
| Metal content/(μg/g) | |
| Fe | 2.7 |
| Ni | 8.6 |
| Cu | 0.2 |
| V | 0.4 |
| Na | 2.2 |
| Ca | 1.3 |

TABLE 4-5

| | Dry gas (C2-) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|
| Catalyst Example 1 | 2.34 | 28.32 | 31.51 | 17.39 | 10.3 | 10.14 | 72.31 |
| Catalyst Example 2 | 2.35 | 27.98 | 32.14 | 17.01 | 10.24 | 10.28 | 72.75 |
| Catalyst Example 3 | 2.44 | 28.66 | 32.91 | 16.07 | 9.31 | 10.61 | 74.62 |
| Catalyst Example 4 | 2.44 | 29.35 | 32.66 | 15.67 | 9.26 | 10.62 | 75.07 |
| Catalyst Example 5 | 2.49 | 29.96 | 33.63 | 14.65 | 8.43 | 10.84 | 76.92 |
| Catalyst Example 6 | 2.6 | 29.65 | 33.16 | 15.09 | 8.63 | 10.87 | 76.28 |
| Catalyst Comparative Example 1 | 2.3 | 26.8 | 30.81 | 18.87 | 11.24 | 9.98 | 69.89 |
| Catalyst Comparative Example 2 | 2.56 | 28.1 | 32.42 | 16.53 | 9.73 | 10.66 | 73.74 |
| Catalyst Comparative Example 3 | 2.62 | 29.01 | 33.42 | 15.1 | 8.84 | 11.01 | 76.06 |
| Catalyst Comparative Example 4 | 2.38 | 27.62 | 31.62 | 17.65 | 10.52 | 10.21 | 71.83 |
| Catalyst Comparative Example 5 | 2.44 | 28.5 | 33.1 | 15.79 | 9.54 | 10.63 | 74.67 |

What is claimed is:

1. A catalytic cracking catalyst, comprising a cracking active component, an optional mesoporous aluminosilicate material, a clay and a binder,
    wherein said cracking active component comprises a rare earth-containing Y zeolite, an optional other Y zeolite, and an optional MFI-structured zeolite,
    said rare earth-containing Y zeolite has a rare earth weight percent as rare earth oxide of 10-25 wt %; a unit cell size of 2.440-2.472 nm; a crystallinity of 35-65%; a Si/Al atom ratio in the skeleton of 2.5-5.0; and a product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 48.

2. The catalytic cracking catalyst according to claim 1, wherein said rare earth-containing Y zeolite has a crystallinity retention after 17 hours of aging treatment at 800° C. in a condition of 100% steam of greater than 40%.

3. The catalytic cracking catalyst according to claim 1, wherein said mesoporous aluminosilicate material has a pseudoboehmite phase structure, an anhydrous chemical expression formula based on the oxide weight ratio of $(0\text{-}0.3)Na_2O.(40\text{-}90)Al_2O_3.(10\text{-}60)SiO_2$, an average pore diameter of 5-25 nm, a specific surface area of 200-400 $m^2/g$, and a pore volume of 0.5-2.0 ml/g; said clay is selected from the group consisting of kaolin, metahalloysite, montmorillonite, diatomite, halloysite, saponite, rectorite, sepiolite, attapulgite, hydrotalcite, bentonite and any mixture thereof; and said binder is selected from the group consisting of silica sol, alumina sol, pseudoboehmite and any mixture thereof.

4. The catalytic cracking catalyst according to claim 1, wherein per 100 weight parts of the catalytic cracking catalyst, said catalytic cracking catalyst contains 10-60 weight parts of the cracking active component, 10-70 weight parts of the clay, 10-60 weights parts of the binder, and 0-20 weight parts of the mesoporous aluminosilicate material.

5. The catalytic cracking catalyst according to claim 1, wherein said cracking active component comprises a rare earth-containing Y zeolite, an other Y zeolite, and an optional MFI-structured zeolite, further wherein said other Y zeolite is selected from the group consisting of rare earth-containing DASY zeolite, rare earth-containing gas-phase ultrastable Y zeolite and Mg-containing ultrastable Y zeolite.

6. The catalytic cracking catalyst according to claim 1, wherein said cracking active component substantially consists of the rare earth-containing Y zeolite, optionally, a rare earth-containing DASY zeolite, and optionally, only one of a rare earth-containing gas-phase ultrastable Y zeolite, a Mg-containing ultrastable Y zeolite and the MFI-structured zeolite.

7. The catalytic cracking catalyst according to claim 1, wherein per 100 weight parts of the catalytic cracking catalyst, said catalytic cracking catalyst contains 10-40 weight parts of the rare earth-containing Y zeolite, 0-15 weight parts of a rare earth-containing DASY zeolite, and 0-25 weight parts of only one of a rare earth-containing gas-phase ultrastable Y zeolite, a Mg-containing ultrastable Y zeolite and the MFI-structured zeolite.

8. The catalytic cracking catalyst according to claim 1, wherein said rare earth-containing Y zeolite is prepared by a process comprising the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1) is subjected to a first calcination to obtain a rare earth- and sodium-containing Y zeolite;
(3) then either the rare earth- and sodium-containing Y zeolite obtained in step (2) is contacted with an ammonium salt solution or an acid solution, and then mixed with a rare earth solution, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3) is subjected to a second calcination to obtain the target rare earth-containing Y zeolite.

9. The catalytic cracking catalyst according to claim 1, wherein said rare earth-containing Y zeolite is prepared by a process comprising the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) then either the rare earth- and sodium-containing Y zeolite obtained in step (2) is contacted with an ammonium salt solution, and then mixed with a rare earth solution without filtration, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3), after being filtered and washed with water, and dried, is subjected to a second calcination to obtain the target rare earth-containing Y zeolite.

10. The catalytic cracking catalyst according to claim 1, wherein said rare earth-containing Y zeolite is prepared by a process comprising the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) the rare earth- and sodium-containing Y zeolite obtained in step (2) is contacted with an ammonium salt solution or an acid solution, filtered, and then mixed with a rare earth solution, and the mixture is adjusted to a pH of 6-10, to obtain a rare earth- and sodium-containing Y zeolite;
(4) the rare earth- and sodium-containing Y zeolite obtained in step (3), after being optionally filtered and washed with water, and dried, is subjected to a second calcination to obtain the target rare earth-containing Y zeolite.

11. The catalytic cracking catalyst according to any one of claims 8-10, wherein the ammonium salt is selected from the group consisting of ammonium chloride, ammonium nitrate, ammonium carbonate, ammonium hydrogen carbonate and any mixture thereof.

12. The catalytic cracking catalyst according to any one of claims 8-10, wherein in step (1),
the weight ratio of the rare earth solution (as rare earth oxide) to the NaY zeolite (on the dry basis) is 0.06-0.14, the weight ratio of the ammonium salt (as ammonium chloride) to the rare earth solution (as rare earth oxide) is 0-10, said ammonium salt is selected from the group consisting of ammonium chloride, ammonium nitrate, ammonium carbonate, ammonium hydrogen carbonate and any mixture thereof, the pH is adjusted to 3.0-5.0, the weight ratio of water:zeolite is controlled to 5-30, said contact is conducted at room temperature to 100° C., for at least 0.3 hour.

13. The catalytic cracking catalyst according to any one of claims 8-10, wherein in step (2), said first calcination is conducted at 500-650° C., in a condition of 0-100% steam for at least 0.5 hour.

14. The catalytic cracking catalyst according to any one of claims 8-10, wherein in step (3),
for the case of contacting the rare earth- and sodium-containing Y zeolite with the ammonium salt solution, the contact is conducted at room temperature to 100° C. for at least 0.3 hour, wherein for the proportions of the rare earth- and sodium-containing Y zeolite and the ammonium salt solution, the weight ratio of the zeolite (dry basis):ammonium salt:water is 1:(0.05-0.5):(5-30), the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, said ammonium salt is selected from the group consisting of ammonium chloride, ammonium nitrate, ammonium carbonate, ammonium hydrogen carbonate and any mixture thereof;
for the case of contacting the rare earth- and sodium-containing Y zeolite with the acid solution, the contact is conducted at room temperature to 100° C. for at least 0.3 hour, wherein for the proportions of the rare earth- and sodium-containing Y zeolite and the acid solution, the weight ratio of zeolite (dry basis):acid:water is 1:(0.03-0.2):(5-30); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2; said acid is selected from an inorganic acid or an organic acid, the inorganic acid is selected from selected from the group consisting of sulphuric acid, hydrochloric acid, nitric acid and any mixture thereof, the organic acid is selected from selected from the group consisting of oxalic acid, acetic acid, citric acid, tartaric acid, and any mixture thereof;
for the case of contacting the rare earth- and sodium-containing Y zeolite with the mixed solution of ammonium salt and rare earth solution, the contact is conducted at room temperature to 100° C. for at least 0.3 hour, wherein for the proportions of the rare earth- and sodium-containing Y zeolite, the ammonium salt, and the rare earth solution, the weight ratio of zeolite (dry basis):ammonium salt:rare earth oxide ($RE_2O_3$):water is 1:(0.05-0.5):(0.01-0.2):(5-30); said ammonium salt is selected from the group consisting of ammonium chloride, ammonium nitrate, ammonium carbonate, ammonium hydrogen carbonate and any mixture thereof.

15. The catalytic cracking catalyst according to claim 14, wherein in step (3), after the contact, the mixture is adjusted with an alkaline liquid to a pH of 6-10.

16. The catalytic cracking catalyst according to claim 15, wherein said alkaline liquid can be selected from the group consisting of aqueous ammonia, sodium silicate, sodium metaaluminate, sodium hydroxide and any mixture thereof.

17. The catalytic cracking catalyst according to any one of claims 8-10, wherein in step (4), said second calcination is conducted at 500-650° C., in a condition of 0-100% steam for 0.5-4 hours.

18. A process for preparing a catalytic cracking catalyst of claim 1, which process comprises: preparing a slurry containing a cracking active component, an optional mesoporous aluminosilicate material, a clay and a binder; and spray-drying the prepared slurry,
wherein said cracking active component comprises: a rare earth-containing Y zeolite, an optional other Y zeolite, and an optional MFI-structured zeolite, wherein said rare earth-containing Y zeolite has a rare earth weight percent as rare earth oxide of 10-25 wt %; a unit cell size of 2.440-2.472 nm; a crystallinity of 35-65%; a Si/Al atom ratio in the skeleton of 2.5-5.0; and a product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 48.

19. The process for preparing the catalytic cracking catalyst according to claim 18, wherein said mesoporous aluminosilicate material has a pseudoboehmite phase structure, an anhydrous chemical expression formula based on the oxide weight ratio of $(0-0.3)Na_2O.(40-90)Al_2O_3.(10-60)SiO_2$, an average pore diameter of 5-25 nm, a specific surface area of 200-400 $m^2/g$, and a pore volume of 0.5-2.0 ml/g;
said clay is selected from the group consisting of kaolin, metahalloysite, montmorillonite, diatomite, halloysite, saponite, rectorite, sepiolite, attapulgite, hydrotalcite, bentonite and any mixture thereof; and
said binder is selected from the group consisting of silica sol, alumina sol, pseudoboehmite and any mixture thereof.

20. The process for preparing the catalytic cracking catalyst according to claim 18, wherein per 100 weight parts of the catalytic cracking catalyst, 10-60 weight parts of the cracking active component, 10-70 weight parts of the clay, 10-60 weight parts of the binder, 0-20 weight parts of the mesoporous aluminosilicate material are used on the dry basis to prepare the slurry.

21. The process for preparing the catalytic cracking catalyst according to claim 18, wherein said cracking active component comprises a rare earth-containing Y zeolite, an other Y zeolite, and an optional MFI-structured zeolite, further wherein said other Y zeolite is selected from the group consisting of rare earth-containing DASY zeolite, rare earth-containing gas-phase ultrastable Y zeolite and Mg-containing ultrastable Y zeolite.

22. The process for preparing the catalytic cracking catalyst according to claim 18, wherein said cracking active component substantially consists of: the rare earth-containing Y zeolite, optionally, a rare earth-containing DASY zeolite, and optionally, only one of a rare earth-containing gas-phase ultrastable Y zeolite, a Mg-containing ultrastable Y zeolite and the MFI-structured zeolite.

23. The process for preparing the catalytic cracking catalyst according to claim 18, wherein per 100 weight parts of the catalytic cracking catalyst, 10-40 weight parts of the rare earth-containing Y zeolite, 0-15 weight parts of a rare earth-containing DASY zeolite, and 0-25 weight parts of only one of a rare earth-containing gas-phase ultrastable Y zeolite, a Mg-containing ultrastable Y zeolite and the MFI-structured zeolite are used on the dry basis to prepare the slurry.

24. The catalytic cracking catalyst according to claim 1, wherein the product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 55.

25. The process for preparing the catalytic cracking catalyst according to claim 18, wherein the product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 55.

* * * * *